United States Patent
Yoshimura

(10) Patent No.: US 11,908,355 B2
(45) Date of Patent: Feb. 20, 2024

(54) PROJECTION METHOD AND PROJECTOR

(71) Applicant: SEIKO EPSON CORPORATION, Tokyo (JP)

(72) Inventor: Jun Yoshimura, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/740,538

(22) Filed: May 10, 2022

(65) Prior Publication Data
US 2022/0358861 A1 Nov. 10, 2022

(30) Foreign Application Priority Data

May 10, 2021 (JP) ................................. 2021-079668

(51) Int. Cl.
*G09G 3/00* (2006.01)

(52) U.S. Cl.
CPC ..... *G09G 3/002* (2013.01); *G09G 2320/0666* (2013.01); *G09G 2354/00* (2013.01)

(58) Field of Classification Search
CPC ............... G09G 3/002; G09G 2354/00; G09G 2320/0666; H04N 9/3182; H04N 9/3194
See application file for complete search history.

(56) References Cited

U.S. PATENT DOCUMENTS

| 10,627,709 B2 * | 4/2020 | Yoneda | G03B 21/2033 |
| 2002/0196554 A1 * | 12/2002 | Cobb | G02B 27/0172 |
| | | | 359/633 |
| 2009/0262098 A1 * | 10/2009 | Yamada | G06F 1/169 |
| | | | 345/175 |
| 2012/0139689 A1 * | 6/2012 | Nakade | G08C 17/02 |
| | | | 340/4.3 |
| 2013/0044187 A1 * | 2/2013 | Hammes | H04N 13/239 |
| | | | 348/46 |
| 2013/0194554 A1 * | 8/2013 | Aruga | G03B 21/005 |
| | | | 353/121 |
| 2014/0098124 A1 * | 4/2014 | Yoshimura | H04N 9/3185 |
| | | | 345/619 |
| 2014/0118705 A1 | 5/2014 | Hasegawa et al. | |

(Continued)

FOREIGN PATENT DOCUMENTS

| JP | 2010-086928 | 4/2010 |
| JP | 2013-033206 | 2/2013 |

(Continued)

OTHER PUBLICATIONS

Matsumoto et al., Plane Fitting-Based Realtime Noise Reduction and Interpolation for 3D Point Clouds Acquired from RGB-D Camera (Realtime Depth Map Noise Reduction for RGB-D Range Data Using Plane Fitting), ITE Journal, vol. 69, No. 3, 2015, 30 pages.

(Continued)

*Primary Examiner* — Benyam Ketema
(74) *Attorney, Agent, or Firm* — Dority & Manning, P.A.

(57) ABSTRACT

A projection method includes detecting a first section formed of a flat surface at a projection surface, detecting a second section formed of a concave surface at the projection surface, projecting image light in a first visual aspect onto the first section by a projector, and projecting image light in a second visual aspect different from the first visual aspect onto the second section by the projector.

14 Claims, 9 Drawing Sheets

(56) References Cited

U.S. PATENT DOCUMENTS

| | | | | |
|---|---|---|---|---|
| 2015/0145755 A1* | 5/2015 | Yamazaki | | G09G 3/03 |
| | | | | 361/679.01 |
| 2015/0301181 A1* | 10/2015 | Herschbach | | G01B 11/2513 |
| | | | | 356/603 |
| 2016/0188028 A1* | 6/2016 | Ono | | G06F 3/042 |
| | | | | 345/175 |
| 2016/0313634 A1* | 10/2016 | Hotta | | G03B 21/142 |
| 2016/0345867 A1* | 12/2016 | Aoki | | A61B 5/1127 |
| 2017/0176578 A1* | 6/2017 | Rae | | G01S 17/003 |
| 2018/0091784 A1* | 3/2018 | Dutton | | H04N 9/315 |
| 2019/0170506 A1* | 6/2019 | Matsumoto | | G03B 21/60 |
| 2019/0265942 A1* | 8/2019 | Yoshimura | | G06F 3/1415 |
| 2020/0004127 A1* | 1/2020 | Yoneda | | G03B 21/56 |
| 2020/0302626 A1* | 9/2020 | Ikeoh | | G06T 7/521 |
| 2020/0310230 A1* | 10/2020 | Liu | | H04N 9/315 |
| 2021/0377501 A1* | 12/2021 | Tu | | H04N 9/3147 |
| 2022/0174247 A1* | 6/2022 | Yoshimura | | H04N 9/3194 |
| 2023/0080888 A1* | 3/2023 | Fujimori | | H04N 9/31 |
| | | | | 348/744 |
| 2023/0102878 A1* | 3/2023 | Wang | | G01S 7/4915 |
| | | | | 348/744 |
| 2023/0108938 A1* | 4/2023 | Hull | | A43B 1/0027 |
| | | | | 345/592 |

FOREIGN PATENT DOCUMENTS

| | | |
|---|---|---|
| JP | 2015-031018 | 2/2015 |
| JP | 2020-014075 | 1/2020 |
| JP | 2020-077059 | 5/2020 |

OTHER PUBLICATIONS

Wakizako et al., "Studies on Range Image Segmentation Using Curvature Signs," Journal of the Robotics Society of Japan, vol. 13, No. 4, May 1995, 33 pages.

* cited by examiner

PROJECTION METHOD AND PROJECTOR

The present application is based on, and claims priority from JP Application Serial Number 2021-079668, filed May 10, 2021, the disclosure of which is hereby incorporated by reference herein in its entirety.

BACKGROUND

1. Technical Field

The present disclosure relates to a projection method and a projector.

2. Related Art

Technologies for projecting a variety of images via a projector have been disclosed. For example, the image projection system described in JP-A-2020-14075 includes a depth camera that three-dimensionally recognizes the area of an object present in front of the background on which an image is projected and a projector that outputs predetermined data to the recognized area or an area outside the recognized area.

The image projection system described in JP-A-2020-14075, however, has room for a higher degree of freedom of the image projected onto the projection surface.

SUMMARY

A projection method according to an aspect of the present application example includes detecting a first section formed of a flat surface at a projection surface, detecting a second section formed of a concave surface at the projection surface, causing a projector to project image light in a first visual aspect onto the first section, and causing the projector to project image light in a second visual aspect different from the first visual aspect onto the second section.

A projector according to another aspect of the present application example includes a light source, a light modulator that modulates light outputted from the light source, a distance sensor, and a controller, and the controller uses the distance sensor to detect a first section formed of a flat surface at a projection surface, uses the distance sensor to detect a second section formed of a concave surface at the projection surface, uses the light source and the light modulator to project image light in a first visual aspect onto the first section, and uses the light source and the light modulator to project image light in a second visual aspect different from the first visual aspect onto the second section.

DESCRIPTION OF EXEMPLARY EMBODIMENTS

An embodiment according to the present disclosure will be described below with reference to the drawings. The present embodiment includes a first embodiment described with reference to FIGS. 1 to 8 and a second embodiment described with reference to FIGS. 1, 2, and 9.

Figure 1:
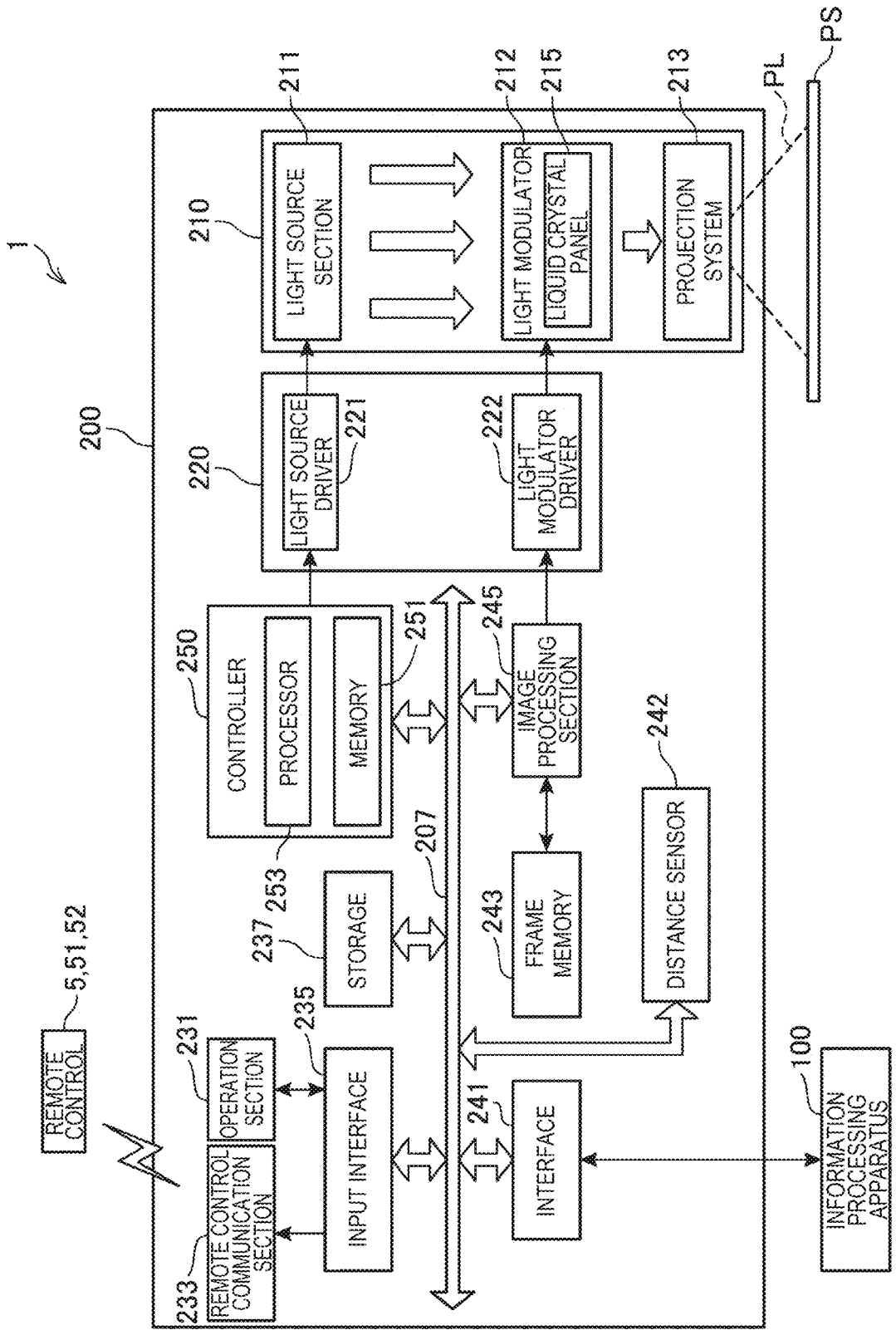
FIG. 1 shows an example of the configuration of a projector according to an embodiment of the present disclosure.

FIG. 1 shows an example of the configuration of a projector 200 according to the present embodiment. The projector 200 projects image light PL toward a projection surface PS to display a projection image on the projection surface PS. In FIG. 1, the projection surface PS is shown in the form of a flat surface for convenience.

The projector 200 includes a projection section 210 and a driver 220, which drives the projection section 210, as shown in FIG. 1. The projection section 210 forms an optical image and projects the image on the projection surface PS.

The projection section 210 includes a light source section 211, a light modulator 212, and a projection system 213. The driver 220 includes a light source driver 221 and a light modulator driver 222.

The light source section 211 includes a light source. The light source section 211 includes, for example, a lamp light source such as a halogen lamp, a xenon lamp, and an ultrahigh-pressure mercury lamp, or a solid-state light source such as an LED (light emitting diode) and a laser light source.

The light source section 211 may include a reflector and an auxiliary reflector that guide the light outputted by the light source to the light modulator 212. The light source section 211 may further include, for example, the following optical elements for enhancing the optical characteristics of the projection light: a lens group; a polarizer; and a light adjustor that is disposed in the path to the light modulator 212 and attenuates the amount of light outputted by the light source.

The light source driver 221 is coupled to an internal bus 207 and turns on and off the light source of the light source section 211 in accordance with an instruction from a controller 250 coupled to the internal bus 207.

The light modulator 212 includes, for example, three liquid crystal panels 215 corresponding to the three primary colors, R, G, and B. The characters R, G, and B stand for red, green, and blue, respectively. That is, the light modulator 212 includes a liquid crystal panel 215 corresponding to the R light, a liquid crystal panel 215 corresponding to the G light, and a liquid crystal panel 215 corresponding to the B light.

The light outputted by the light source section 211 is separated into three types of color light of the R light, the G light, and the B light, which enter the liquid crystal panels 215 corresponding thereto. The three liquid crystal panels 215 are each a transmissive liquid crystal panel and each modulate the light passing therethrough to generate the image light PL. The image light PL having passed through each of the liquid crystal panels 215 and having therefore been modulated is combined with the others by a light combining system, such as a cross dichroic prism, and the combined image light PL exits toward the projection system 213.

The present embodiment will be described with reference to the case where the light modulator 212 includes the transmissive liquid crystal panels 215 as light modulation devices, but not necessarily. The light modulation devices may each be a reflective liquid crystal panel or a digital micromirror device.

The light modulator 212 is driven by the light modulator driver 222. The light modulator driver 222 is coupled to an image processing section 245.

Image data corresponding to the RGB primary colors are inputted from the image processing section 245 to the light modulator driver 222. The light modulator driver 222 can be formed, for example, of an integrated circuit. The light modulator driver 222 converts the inputted image data into data signals suitable for the action of the liquid crystal panels 215. The light modulator driver 222 applies voltage to each pixel of each of the liquid crystal panels 215 based on the data signals as a result of the conversion to draw an image in the liquid crystal panel 215.

The projection system 213 includes a lens, a mirror, and other components that bring the incident image light PL into focus on the projection surface PS. The projection system 213 may include, for example, a zoom mechanism that enlarges or reduces an image to be projected onto the projection surface PS and a focus adjustment mechanism that performs focus adjustment.

The projector 200 further includes an operation section 231, a remote control communication section 233, an input interface 235, a storage 237, an interface 241, a distance sensor 242, a frame memory 243, the image processing section 245, and the controller 250. The input interface 235, the storage 237, the interface 241, the distance sensor 242, the image processing section 245, and the controller 250 are so coupled to each other via the internal bus 207 as to be capable of data communication.

The operation section 231 includes a variety of buttons or switches provided at the surface of an enclosure of the projector 200, generates an operation signal corresponding to operation performed on any of the buttons or switches, and outputs the generated operation signal to the input interface 235. The input interface 235 includes a circuit that outputs the operation signal inputted from the operation section 231 to the controller 250.

The remote control communication section 233 performs infrared communication or short-range wireless communication with a remote control 5. The remote control 5 includes a touch panel 51 and a variety of operation keys 52. The remote control 5 may be a portable electronic apparatus such as a smartphone.

The touch panel 51 includes an LCD (liquid crystal display) and a touch sensor. The LCD displays a variety of images, including a display visual aspect setting screen 300, a display visual aspect setting screen 310, and a display visual aspect setting screen 320 shown in FIGS. 3 to 5.

The remote control 5 receives a communication signal from the remote control communication section 233, decodes the communication signal into an image signal, and displays an image corresponding to the image signal on the LCD of the touch panel 51.

The touch sensor is integrated with the display surface of the LCD and accepts a user's touch operation. The operation keys 52 also accept the user's operation.

The remote control 5 encodes an operation signal corresponding to the operation received by the touch sensor of the touch panel 51 or any of the operation keys 52 into a communication signal and transmits the communication signal to the remote control communication section 233.

Figure 3:
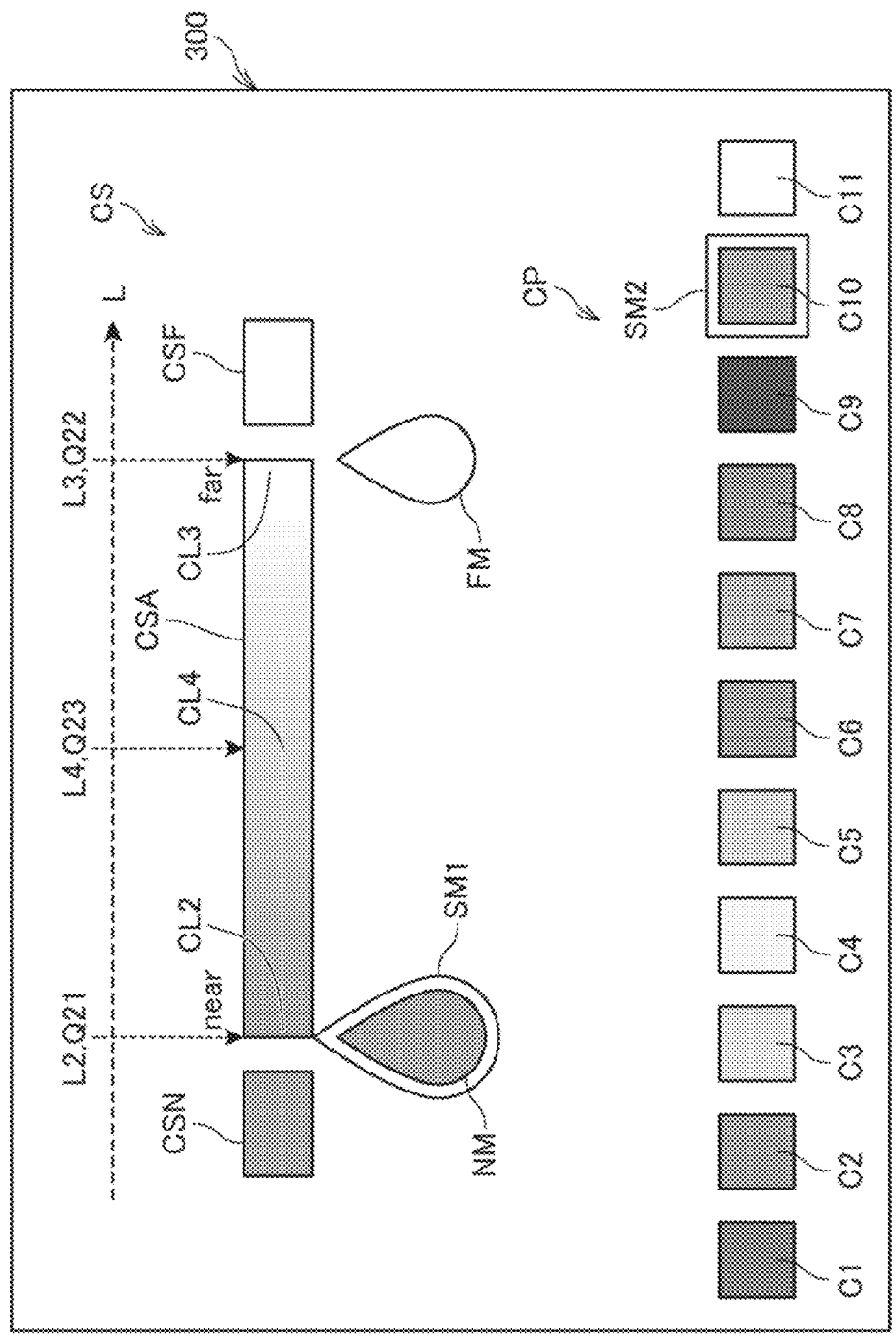
FIG. 3 is a screen diagram showing an example of a display visual aspect setting screen corresponding to a concave surface.
Figure 4:
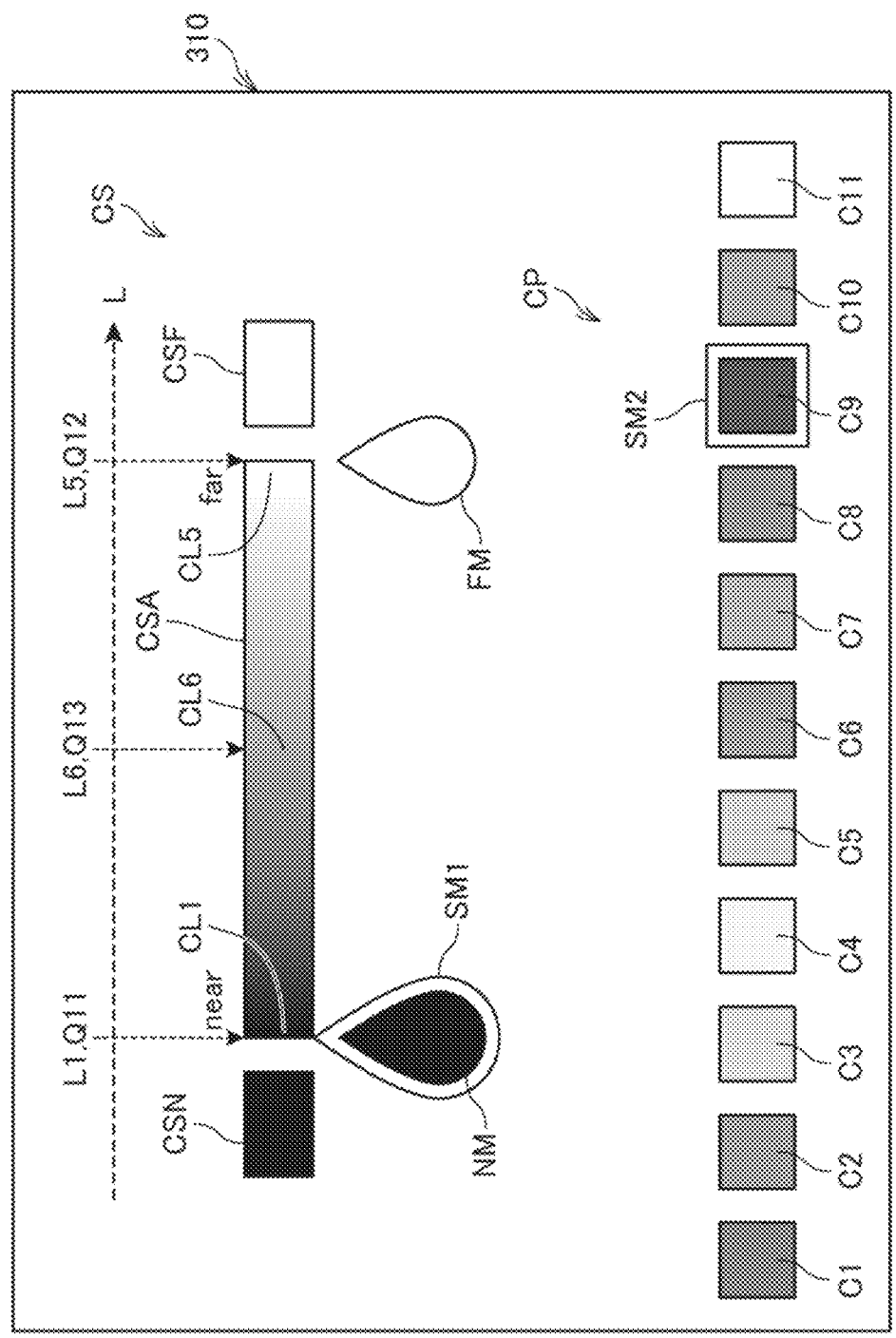
FIG. 4 is a screen diagram showing an example of a display visual aspect setting screen corresponding to a flat surface.
Figure 5:
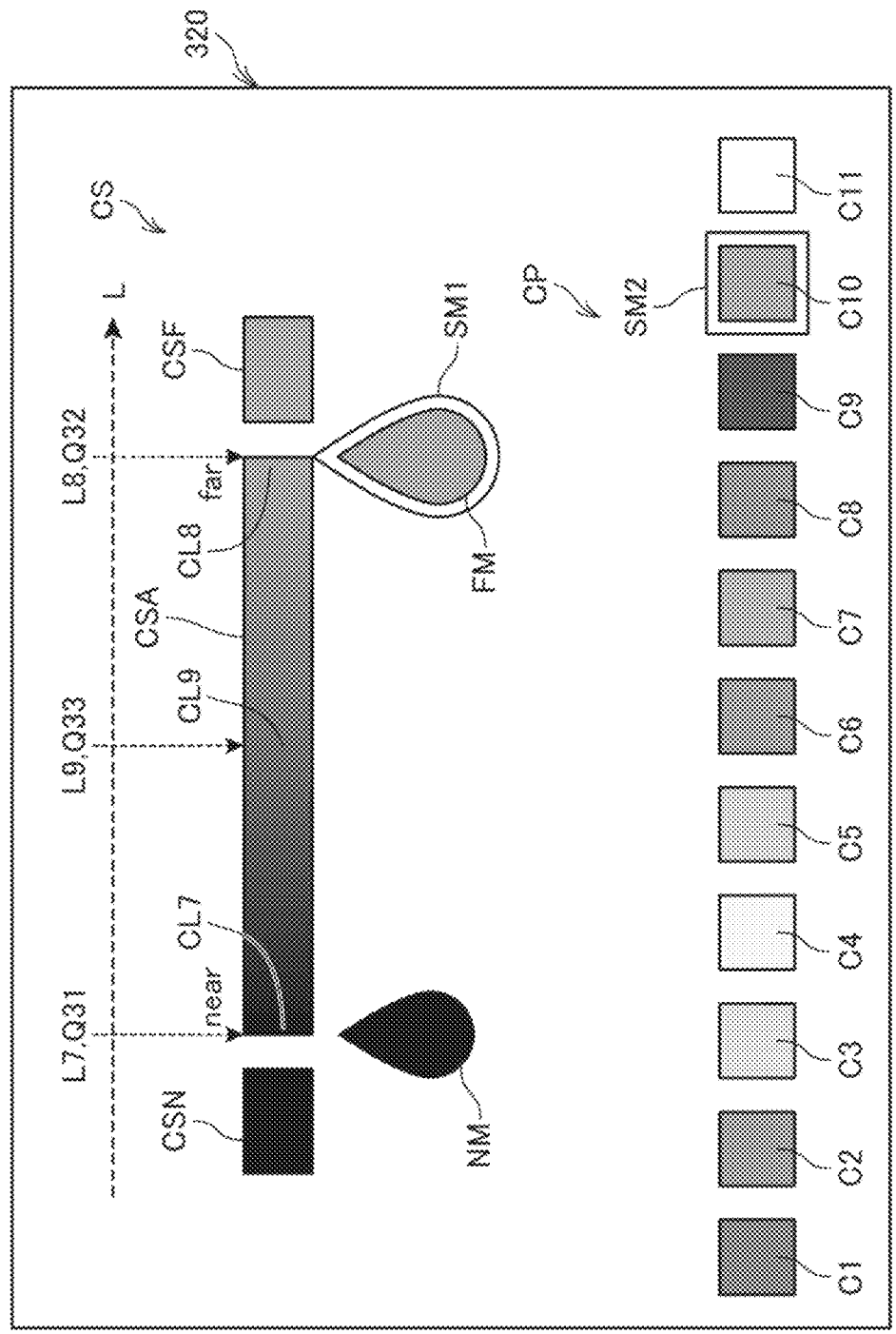
FIG. 5 is a screen diagram showing an example of a display visual aspect setting screen corresponding to a convex surface.

In the first embodiment, the remote control 5 displays a variety of images, including the display visual aspect setting screen 300, the display visual aspect setting screen 310, and the display visual aspect setting screen 320 shown in FIGS. 3 to 5, and the projector 200 accepts display visual aspect settings from the remote control 5, but not necessarily.

For example, an information processing apparatus 100 may display a variety of images, including the display visual aspect setting screen 300, the display visual aspect setting screen 310, and the display visual aspect setting screen 320 shown in FIGS. 3 to 5, and the projector 200 may accept display visual aspect settings from the information processing apparatus 100.

Still instead, for example, the operation section 231 may display a variety of images, including the display visual aspect setting screen 300, the display visual aspect setting screen 310, and the display visual aspect setting screen 320 shown in FIGS. 3 to 5, and the projector 200 may accept display visual aspect settings from the operation section 231.

The remote control communication section 233 receives an infrared signal transmitted from the remote control 5 and decodes the received infrared signal to generate an operation signal. The remote control communication section 233 outputs the generated operation signal to the input interface 235. The input interface 235 outputs the operation signal inputted from the remote control communication section 233 to the controller 250.

The remote control communication section 233 further transmits a variety of images to the remote control 5, for example, in accordance with instructions from the controller 250. The remote control communication section 233 encodes an image signal inputted from the controller 250 to generate an infrared signal. The remote control communication section 233 transmits the generated infrared signal to the remote control 5.

The storage 237 is, for example, a magnetic recording apparatus such as an HDD (hard disk drive), or a storage apparatus using a semiconductor storage device such as a flash memory. The storage 237 stores, for example, a program executed by the controller 250, data processed by the controller 250, and image data.

The interface 241 is a communication interface that performs communication with the information processing apparatus 100 in accordance, for example, with the Ethernet (registered trademark) standard. The interface 241 includes a connector to which an Ethernet (registered trademark) cable is connected and an interface circuit that processes a signal transmitted via the connector. The interface 241 is an interface substrate including the connector and the interface circuit and is coupled to a main substrate of the controller 250 that is a substrate on which a processor 253 and other components are mounted. The connector and the interface circuit that form the interface 241 are instead mounted on the main substrate of the controller 250. The interface 241 receives, for example, a variety of pieces of setting information and a variety of pieces of instruction information from the information processing apparatus 100.

The information processing apparatus 100 is formed, for example, of a personal computer and transmits the variety of pieces of setting information and the variety of pieces of instruction information to the projector 200.

An image display system 1 according to the present embodiment includes the information processing apparatus 100 and the projector 200.

The distance sensor 242 is, for example, an ultrasonic sensor. The distance sensor 242 detects a distance LA between the projector 200 and the projection surface PS. Specifically, the distance sensor 242 detects the distance LA between the distance sensor 242 and an arbitrary portion that forms the projection surface PS. The distance sensor 242 outputs information representing the detected distance LA to the controller 250.

The present embodiment is described with reference to the case where the distance sensor 242 is an ultrasonic sensor, but not necessarily. The distance sensor 242 may, for example, be an optical sensor (LiDAR: Light Detection and Ranging) or a radio wave sensor (radar: Radio Detecting and Ranging).

The image processing section 245 and the frame memory 243 can be formed, for example, of an integrated circuit. The integrated circuit includes an LSI (large scale integration), an ASIC (application specific integrated circuit), and a PLD (programmable logic device). The PLD includes, for example, an FPGA (field-programmable gate array). An analog circuit may form part of the configuration of the integrated circuit, or the combination of a processor and an integrated circuit may be used. The combination of a processor and an integrated circuit is called, for example, a microcontroller unit (MCU), a SoC (system-on-a-chip), a system LSI, and a chipset.

The image processing section 245 develops image data inputted via the interface 241 in the frame memory 243. The frame memory 243 includes a plurality of banks. The banks each have storage capacity that allows image data corresponding to one frame to be written on the bank. The frame memory 243 is formed, for example, of an SDRAM (synchronous dynamic random access memory).

The image processing section 245 performs image processing on the image data developed in the frame memory 243, for example, resolution conversion or resizing, distortion correction, shape correction, digital zooming, and image color tone and brightness adjustment.

The image processing section 245 converts an input frame frequency of the vertical sync signal into a drawing frequency and generates a vertical sync signal having the drawing frequency. The generated vertical sync signal is called an output sync signal. The image processing section 245 outputs the generated output sync signal to the light modulator driver 222.

The controller 250 includes a memory 251 and the processor 253.

The memory 251 is a storage device that stores a program executed by the processor 253 and data processed by the processor 253 in a nonvolatile manner. The memory 251 is formed of a magnetic storage device, a semiconductor storage device such as a flash ROM (read only memory), or any other type of nonvolatile storage device. The memory 251 may include a RAM (random access memory) that forms a work area for the processor 253. The memory 251 stores data to be processed by the controller 250 and a control program executed by the processor 253.

The processor 253 may be formed of a single processor, or a plurality of processors may function as the processor 253. The processor 253 executes the control program to control each portion of the projector 200. For example, the processor 253 outputs an instruction of execution of image processing corresponding to operation accepted by the operation section 231 or the remote control 5 and parameters used in the image processing to the image processing section 245. The parameters include, for example, a geometric correction parameter for correcting geometric distortion of an image to be projected onto the projection surface PS. The processor 253 further controls the light source driver 221 to turn on and off the light source section 211 and adjust the luminance of the light from the light source section 211.

The processor 253 of the controller 250 carries out the processes below by executing the control program stored in the memory 251. The processes carried out by the processor 253 will be described with reference to FIG. 2.

Figure 2:
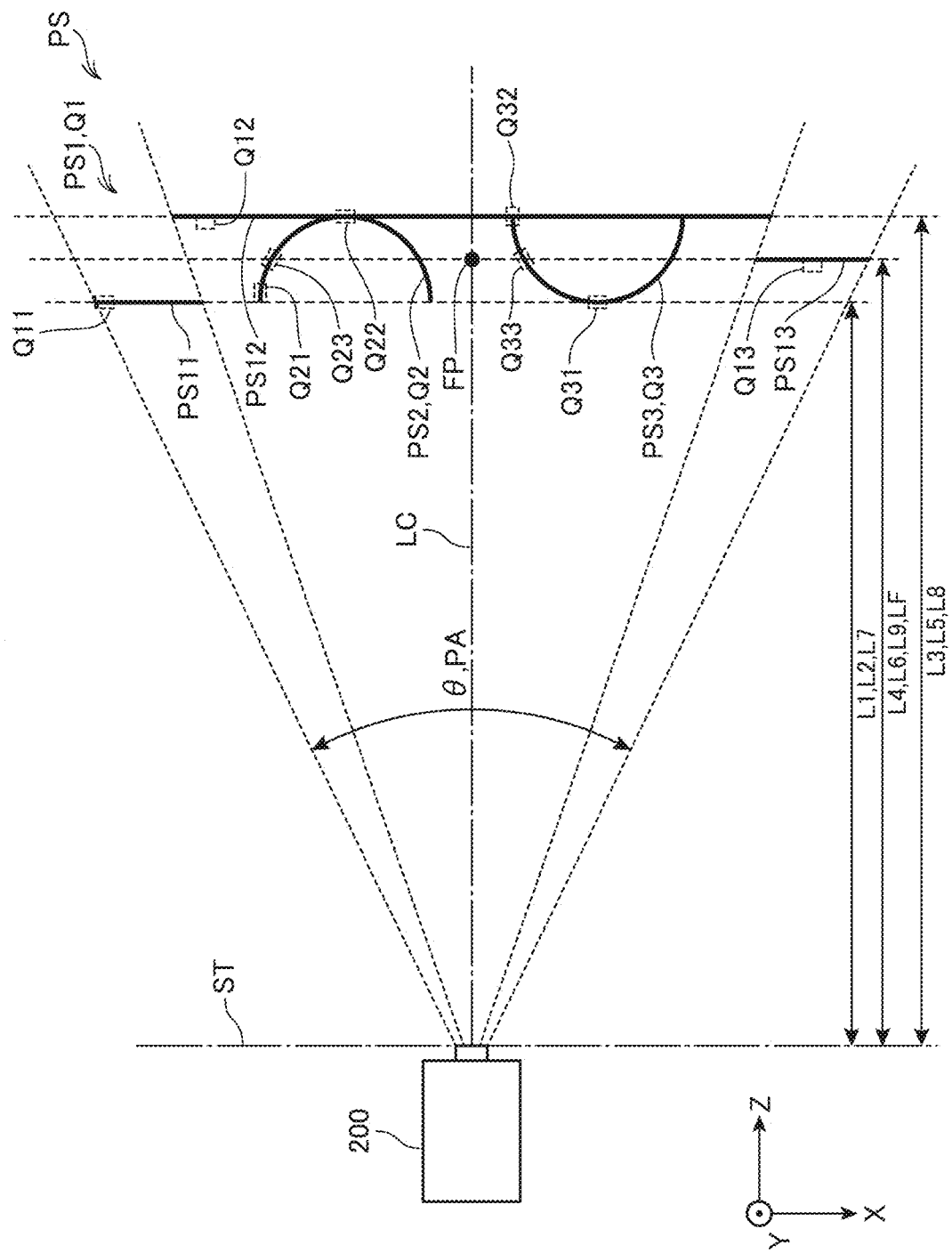
FIG. 2 is a plan view showing an example of a reference plane and a projection surface according to the embodiment.

FIG. 2 is a plan view showing an example of a reference plane ST and the projection surface PS according to the present embodiment.

FIG. 2 shows axes X, Y, and Z perpendicular to one another. The axis Y is parallel to the vertical direction, and the axes X and Z are parallel to the horizontal direction. In FIG. 2, when the user faces the projection surface PS, the axis X represents the rightward-leftward direction, and the axis Z represents the frontward-rearward direction. The positive direction of the axis X represents the rightward direction, the positive direction of the axis Y represents the upward direction, and the positive direction of the axis Z represents the forward direction.

The projector 200 is disposed in a position shifted in the negative direction of the axis Z from the projection surface PS.

The processor 253 detects a distance L. The processor 253, for example, acquires the distance LA from the distance sensor 242 and calculates the distance L based on the distance LA. The distance L represents the distance between the reference plane ST and the projection surface PS, as shown in FIG. 2.

The reference plane ST is, for example, a flat plane perpendicular to a projection axis LC of the projector 200.

The reference plane ST is a flat plane located at the positive end of the projector 200 in the axis-Z direction and perpendicular to the projection axis LC.

The projection axis LC represents the center axis of a projection range PA of the projection light. The projection range PA is, for example, a range having a spread angle $\theta$ around the projection axis LC.

The present embodiment will be described with reference to the case where the reference plane ST is a flat plane located at the positive end of the projector 200 in the axis-Z direction and perpendicular to the projection axis LC, but not necessarily. The reference plane ST only needs to be a flat plane perpendicular to the projection axis LC. The reference plane ST may instead, for example, be a flat plane located at the center of the projector 200 in the axis-Z direction and perpendicular to the projection axis LC.

The reference plane ST only needs to be a plane that intersects with the projection axis LC of the projector 200. The reference plane may be a curved surface.

The projection surface PS includes a flat surface PS1, a concave surface PS2, and a convex surface PS3.

The concave surface PS2 is so formed that the distances L to points inside the concave surface PS2 are longer than the distances L to points on the outer edge of the concave surface PS2. The convex surface PS3 is so formed that the distances L to points inside the convex surface PS3 are shorter than the distances L to the points on the outer edge of the convex surface PS3.

The present embodiment will be described with reference to a case where the concave surface PS2 and the convex surface PS3 are each a hemispherical surface.

The present embodiment will be described with reference to the case where the concave surface PS2 and the convex surface PS3 are each a hemispherical surface, but not necessarily. The concave surface PS2 and the convex surface PS3 may each be part of a spherical surface or part of an ellipsoid.

The processor 253 detects the flat surface PS1, the concave surface PS2, and the convex surface PS3 based on the distance L. When the distance L is substantially fixed at the projection surface PS, the processor 253 detects the flat surface PS1.

When the distance L changes at the projection surface PS, the processor 253 calculates the radius of curvature of the projection surface PS. For example, when the radius of curvature is greater than or equal to a first radius but smaller than or equal to a second radius, and the center of curvature is located in a position shifted in the negative direction of the axis Z from the position where the distance L starts changing along the projection surface PS, the processor 253 detects the concave surface PS2. When the radius of curvature is greater than or equal to the first radius but smaller than or equal to the second radius, and the center of curvature is located in a position shifted in the positive direction of the axis Z from the position where the distance L starts changing along the projection surface PS, the processor 253 detects the convex surface PS3.

The first radius is, for example, 10 mm, and the second radius is, for example, 1000 mm.

The concave surface PS2 includes a second section Q21, a third section Q22, and a fourth section Q23.

The processor 253 detects the second section Q21, the third section Q22, and the fourth section Q23.

The processor 253 projects the image light in a second visual aspect AP2 different from a first visual aspect AP1 onto the second section Q21. The "first visual aspect" is, for example, a first color CL1 (black), which will be described with reference to FIG. 4. The "second visual aspect" is, for example, a second color CL2 (gray), which will be described with reference to FIG. 3.

The processor 253 calculates a second distance L2, a third distance L3, and a fourth distance L4. The second distance L2 represents the distance L between the reference plane ST and the second section Q21 of the concave surface PS2. The third distance L3 represents the distance L between the reference plane ST and the third section Q22 of the concave surface PS2. The fourth distance L4 represents the distance L between the reference plane ST and the fourth section Q23 of the concave surface PS2.

The fourth distance L4 is longer than the second distance L2 but shorter than the third distance L3, as shown in FIG. 2.

A focal length LF represents the distance between the reference plane ST and a focal point FP of the projector 200. The second distance L2 is shorter than the focal length LF, and the third distance L3 is longer than the focal length LF. For example, the focal length LF coincides with the fourth distance L4.

An image in focus can therefore be projected onto the projection surface PS when the distance L satisfies Expression (1) below.

$$(LF-FR/2) \leq L \leq (LF+FR/2) \quad (1)$$

A depth of focus FR represents the depth of focus FR of the projector 200.

Therefore, when the projection surface PS satisfies Expression (1) described above, an image in focus can be projected onto the projection surface PS. An image in focus can therefore be projected onto at least part of the area of the projection surface PS.

When the second distance L2 is longer than or equal to (LF−FR/2) and the third distance L3 is shorter than or equal to (LF+FR/2), an image in focus can be projected over the entire area of the projection surface PS.

First Embodiment

FIG. 3 is a screen diagram showing an example of the display visual aspect setting screen 300 corresponding to the concave surface PS2 according to a first embodiment.

In the first embodiment, the processor 253 accepts input of information that specifies the second color CL2 and a third color CL3 from the remote control 5 via the display visual aspect setting screen 300.

The second color CL2 corresponds to an example of the "second visual aspect". The second color CL2 represents the color of the projection light projected onto the second section Q21 of the concave surface PS2.

The third color CL3 corresponds to an example of a "third visual aspect". The third color CL3 represents the color of the projection light projected onto the third section Q22 of the concave surface PS2.

The "third visual aspect" differs from the "second visual aspect". In other words, the third color CL3 differs from the second color CL2. For example, in FIG. 3, the third color CL3 is white, and the second color CL2 is gray.

The display visual aspect setting screen 300 is displayed on the LCD of the touch panel 51 of the remote control 5 in accordance with an instruction from the controller 250. The display visual aspect setting screen 300 is a screen via which the display visual aspect of the projection image to be displayed on the projection surface PS is set based on the user's operation. The display visual aspect setting screen 300 is used when the projection image is displayed on the projection surface PS shown in FIG. 2 and corresponds to an example of a screen via which the display visual aspect of the projection image to be projected on the concave surface PS2 shown in FIG. 2 is set.

The display visual aspect setting screen 300 displays a setting result display section CS, a visual aspect selection section CP, a first position selection mark NM, and a second position selection mark FM, as shown in FIG. 3. The setting result display section CS includes a first setting result display section CSA, a second setting result display section CSN, and a third setting result display section CSF.

The first setting result display section CSA displays the visual aspect of the image light PL to be projected onto the projection surface PS within the range where the distance L is longer than or equal to the second distance L2 but shorter than or equal to the third distance L3. In FIG. 3, the first setting result display section CSA displays the color of the image light PL to be projected onto the concave surface PS2 within the range where the distance L is longer than or equal to the second distance L2 but shorter than or equal to the third distance L3.

The second setting result display section CSN displays the visual aspect of the image light PL to be projected onto the concave surface PS2 the distance L to which is shorter than the second distance L2. The second setting result display section CSN is set in the second visual aspect AP2. In FIG. 3, the second setting result display section CSN displays the color of the image light PL to be projected onto the concave surface PS2 the distance L to which is shorter than the second distance L2, that is, gray which is the second color CL2 in FIG. 3.

The third setting result display section CSF displays the visual aspect of the image light PL to be projected onto a portion of the concave surface PS2, the portion the distance L to which is longer than the third distance L3. The third setting result display section CSF is set in a third visual aspect AP3. In FIG. 3, the third setting result display section CSF displays the color of the image light PL to be projected onto the portion of the concave surface PS2 the distance L to which is longer than the third distance L3, that is, white, which is the third color CL3 in FIG. 3.

The first position selection mark NM and the second position selection mark FM are each displayed in a selectable manner based on the user's operation.

The first position selection mark NM is selected by the user when the user sets the color of the image light PL on the concave surface PS2 corresponding to the second distance L2. The user selects the first position selection mark NM, for example, by touching the first position selection mark NM.

The second position selection mark FM is selected by the user when the user sets the color of the image light PL on the concave surface PS2 corresponding to the third distance L3. The user selects the second position selection mark FM, for example, by touching the second position selection mark FM.

FIG. 3 shows the state in which the first position selection mark NM has been selected. A first selection mark SM1 displayed around the first position selection mark NM indicates that the first position selection mark NM has been selected. When the second position selection mark FM has been selected, the first selection mark SM1 is displayed around the second position selection mark FM. The first selection mark SM1 highlights the selected one of the first position selection mark NM and the second position selection mark FM.

The visual aspect selection section CP is selected by the user when the user sets the visual aspect of the image light PL on the concave surface PS2 corresponding to the second distance L2 or the visual aspect of the image light PL on the concave surface PS2 corresponding to the third distance L3. In FIG. 3, the visual aspect selection section CP is selected by the user when the user sets the color of the image light PL on the concave surface PS2 corresponding to the second distance L2 or the color of the image light PL on the concave surface PS2 corresponding to the third distance L3.

The visual aspect selection section CP includes visual aspect display sections C1 to C11. The visual aspect display section C1 to the visual aspect display section C11 are selected by the user when the user sets the color of the image light PL on the concave surface PS2 corresponding to the second distance L2 or the color of the image light PL on the concave surface PS2 corresponding to the third distance L3.

The visual aspect display section C1 to the visual aspect display section C8 show chromatic colors such as red, green, and blue, the visual aspect display section C9 shows black, the visual aspect display section C10 shows gray, and the visual aspect display section C11 shows white.

FIG. 3 shows the state in which the visual aspect display section C10 has been selected. A second selection mark SM2 displayed around the visual aspect display section C10 indicates that the visual aspect display section C10 has been selected. That is, the selected visual aspect is highlighted. The user selects the visual aspect display section C10, for example, by touching the visual aspect display section C10.

The color of the image light PL on the concave surface PS2 corresponding to the second distance L2 can be set gray, which is the second color CL2, by touching the first position selection mark NM to select the first position selection mark NM and then touching the visual aspect display section C10 of the visual aspect selection section CP to select the visual aspect display section C10, as shown in FIG. 3. The color of the image light PL on the concave surface PS2 corresponding to the third distance L3 can be set white, which is the third color CL3, by touching the second position selection mark FM to select the second position selection mark FM and then touching the visual aspect display section C11 of the visual aspect selection section CP to select the visual aspect display section C11.

As a result, gray, which is the second color CL2, is set at a left end portion of the first setting result display section CSA, white, which is the third color CL3, is set at a right end portion of the first setting result display section CSA, and an intermediate color CL4 is displayed at a central portion of the first setting result display section CSA.

The second setting result display section CSN is set gray, which is the second color CL2, and the third setting result display section CSF is set white, which is the third color CL3.

As described with reference to FIG. 3, the color of the image light PL on the concave surface PS2 can be set by setting the color of the image light PL on the concave surface PS2 corresponding to the second distance L2 and the color of the image light PL on the concave surface PS2 corresponding to the third distance L3, as shown in the setting result display section CS. As a result, a projection image having a high degree of freedom can be displayed on the concave surface PS2.

When gray is set as the second color CL2 at the left end portion of the first setting result display section CSA and white is set as the third color CL3 at the right end portion of the first setting result display section CSA, as shown in FIG. 3, the processor 253 carries out the following processes.

The processor 253 projects the image light PL in the second visual aspect AP2 according to the second distance L2 onto the second section Q21. The second visual aspect AP2 represents, for example, the second color CL2. The second color CL2 is, for example, gray, as shown in FIG. 3.

The processor 253 projects the image light PL in the third visual aspect AP3 according to the third distance L3 onto the third section Q22. The third visual aspect AP3 represents, for example, the third color CL3. The third color CL3 is, for example, white, as shown in FIG. 3.

The processor 253 projects the image light PL in a fourth visual aspect AP4 based on the second visual aspect AP2 and the third visual aspect AP3 onto the fourth section Q23. The fourth visual aspect AP4 represents, for example, the intermediate color CL4 between the second color CL2 and the third color CL3. The intermediate color CL4 is, for example, light gray.

A luminance value B4 of the intermediate color CL4 corresponding to the fourth distance L4 is expressed, for example, by Expression (2) below.

$$B4=((L4-L2)\times B3+(L3-L4)\times B2)/(L3-L2) \qquad (2)$$

The luminance value B2 represents the luminance value of the second color CL2, and the luminance value B3 represents the luminance value of the third color CL3.

In FIG. 3, the description has been made of the case where the color of the image light PL on the concave surface PS2 corresponding to the second distance L2 is set gray, which is the second color CL2, and the color of the image light PL on the concave surface PS2 corresponding to the third distance L3 is set white, which is the third color CL3, but not necessarily. A chromatic color may be set as at least one of the color of the image light PL on the concave surface PS2 corresponding to the second distance L2 and the color of the image light PL on the concave surface PS2 corresponding to the third distance L3.

For example, when the color of the image light PL on the concave surface PS2 corresponding to the second distance L2 is set red and the color of the image light PL on the concave surface PS2 corresponding to the third distance L3 is set green, the colors corresponding to the line segment that connects the point corresponding to red to the point corresponding to green in the RGB color space are set as the colors of the image light PL on the concave surface PS2. A colorful projection image can therefore be displayed on the concave surface PS2.

The first embodiment is described with reference to the case where the second color CL2 is gray and the third color CL3 is white, but not necessarily. For example, the second color CL2 may be a chromatic color, and the third color CL3 may be a chromatic color different from the second color CL2. When the R, G, and B components of the second color CL2 are (R2, G2, B2) and the R, G, and B components of the third color CL3 are (R3, G3, B3), the intermediate color CL4 is expressed, for example, by Expressions (3) to (5) below.

$$R4=((L4-L2)\times R3+(L3-L4)\times R2)/(L3-L2) \quad (3)$$

$$G4=((L4-L2)\times G3+(L3-L4)\times G2)/(L3-L2) \quad (4)$$

$$B4=((L4-L2)\times B3+(L3-L4)\times B2)/(L3-L2) \quad (5)$$

In the expressions, the components (R4, G4, B4) denote the components R, G, and B of the intermediate color CL4.

FIG. 4 is a screen diagram showing an example of the display visual aspect setting screen 310 corresponding to the flat surface PS1.

The flat surface PS1 includes a first flat surface PS11, a second flat surface PS12, and a third flat surface PS13, as shown in FIG. 2.

The first flat surface PS11, the second flat surface PS12, and the third flat surface PS13 are each perpendicular to the axis Z. The first flat surface PS11, the second flat surface PS12, and the third flat surface PS13 are arranged in this order in the positive direction of the axis X.

The first flat surface PS11 includes a first section Q11, the second flat surface PS12 includes a fifth section Q12, and the third flat surface PS13 includes a sixth section Q13.

The processor 253 detects the first section Q11, the fifth section Q12, and the sixth section Q13.

The processor 253 calculates a first distance L1, a fifth distance L5, and a sixth distance L6. The first distance L1 represents the distance L between the reference plane ST and the first section Q11 of the first flat surface PS11. The fifth distance L5 represents the distance L between the reference plane ST and the fifth section Q12 of the second flat surface PS12. The sixth distance L6 represents the distance L between the reference plane ST and the sixth section Q13 of the third flat surface PS13.

The sixth distance L6 is longer than the first distance L1 but shorter than the fifth distance L5, as shown in FIG. 2.

In the first embodiment, the processor 253 accepts input of information that specifies the first color CL1 and a fifth color CL5 from the remote control 5 via the display visual aspect setting screen 310.

The first color CL1 corresponds to an example of the "first visual aspect". The first color CL1 represents the color of the projection light projected onto the first section Q11 of the first flat surface PS11, which forms the flat surface PS1.

The fifth color CL5 corresponds to an example of a "fifth visual aspect". The fifth color CL5 represents the color of the projection light projected onto the fifth section Q12 of the second flat surface PS12, which forms the flat surface PS1. The fifth color CL5 differs from the first color CL1.

The display visual aspect setting screen 310 displays the setting result display section CS, the visual aspect selection section CP, the first position selection mark NM, and the second position selection mark FM, as shown in FIG. 4. The setting result display section CS includes the first setting result display section CSA, the second setting result display section CSN, and the third setting result display section CSF.

A method for operating the display visual aspect setting screen 310 is the same as the method for operating the display visual aspect setting screen 300 described with reference to FIG. 3. The display visual aspect setting screen 300 shown in FIG. 3, however, differs from the display visual aspect setting screen 310 shown in FIG. 4 in terms of the point below. That is, the left end of the first setting result display section CSA corresponds to the second distance L2, and the right end of the first setting result display section CSA corresponds to the third distance L3 in FIG. 3. In contrast, the left end of the first setting result display section CSA corresponds to the first distance L1, and the right end of the first setting result display section CSA corresponds to the fifth distance L5 in FIG. 4. In accordance with the difference, the method for operating the display visual aspect setting screen 300, which sets the visual aspect of the image light PL to be projected onto the concave surface PS2 corresponding to the distances L from the second distance L2 to the third distance L3, differs from the method for operating the display visual aspect setting screen 310, which sets the visual aspect of the image light PL to be projected onto the flat surface PS1 corresponding to the distances L from the first distance L1 to the fifth distance L5.

The first setting result display section CSA displays the visual aspect of the image light PL to be projected onto the projection surface PS within the range where the distance L is longer than or equal to the first distance L1 but shorter than or equal to the fifth distance L5. In FIG. 4, the first setting result display section CSA displays the color of the image light PL to be projected onto the flat surface PS1 within the range where the distance L is longer than or equal to the first distance L1 but shorter than or equal to the fifth distance L5.

For example, the first distance L1 coincides with the second distance L2, and the fifth distance L5 coincides with the third distance L3, as shown in FIG. 2.

FIG. 4 shows the state in which the visual aspect display section C9 has been selected. The second selection mark SM2 displayed around the visual aspect display section C9 indicates that the visual aspect display section C9 has been selected. That is, the selected visual aspect is highlighted. The user selects the visual aspect display section C9, for example, by touching the visual aspect display section C9.

The color of the image light PL on the flat surface PS1 corresponding to the first distance L1 can be set black, which is the first color CL1, by touching the first position selection mark NM to select the first position selection mark NM and then touching the visual aspect display section C9 of the visual aspect selection section CP to select the visual aspect display section C9, as shown in FIG. 4. The color of the image light PL on the flat surface PS1 corresponding to the fifth distance L5 can be set white, which is the fifth color CL5, by touching the second position selection mark FM to select the second position selection mark FM and then touching the visual aspect display section C11 of the visual aspect selection section CP to select the visual aspect display section C11.

As a result, black, which is the first color CL1, is set at the left end portion of the first setting result display section CSA, white, which is the fifth color CL5, is set at the right end portion of the first setting result display section CSA, and an intermediate color CL6 is displayed at the central portion of the first setting result display section CSA.

The second setting result display section CSN is set black, which is the first color CL1, and the third setting result display section CSF is set white, which is the fifth color CL5.

As described with reference to FIG. 4, the color of the image light PL on the flat surface PS1 can be set by setting the color of the image light PL on the flat surface PS1 corresponding to the first distance L1 and the color of the image light PL on the flat surface PS1 corresponding to the fifth distance L5, as shown in the setting result display section CS. As a result, a projection image having a high degree of freedom can be displayed on the flat surface PS1.

When black is set as the first color CL1 at the left end portion of the first setting result display section CSA and white is set as the fifth color CL5 at the right end portion of the first setting result display section CSA, as shown in FIG. 4, the processor 253 carries out the following processes.

The processor 253 projects the image light PL in the first visual aspect AP1 according to the first distance L1 onto the first section Q11. The first visual aspect AP1 represents, for example, the first color CL1. The first color CL1 is, for example, black, as shown in FIG. 4.

The processor 253 projects the image light PL in the fifth visual aspect AP5 according to the fifth distance L5 onto the fifth section Q12. The fifth visual aspect AP5 represents, for example, the fifth color CL5. The fifth color CL5 is, for example, white, as shown in FIG. 4.

The processor 253 projects the image light PL in a sixth visual aspect AP6 based on the first visual aspect AP1 and the fifth visual aspect AP5 onto the sixth portions Q13. The sixth visual aspect AP6 represents, for example, the intermediate color CL6 between the first color CL1 and the fifth color CL5. The intermediate color CL6 is, for example, gray.

A luminance value B6 of the intermediate color CL6 corresponding to the sixth distance L6 is expressed, for example, by Expression (6) below.

$$B6=((L6-L1) \times B5+(L5-L6) \times B1)/(L5-L1) \qquad (6)$$

The luminance value B1 represents the luminance value of the first color CL1, and the luminance value B5 represents the luminance value of the fifth color CL5.

In FIG. 4, the description has been made of the case where the color of the image light PL on the flat surface PS11 corresponding to the first distance L1 is set black, which is the first color CL1, and the color of the image light PL on the flat surface PS12 corresponding to the fifth distance L5 is set white, which is the fifth color CL5, but not necessarily. A chromatic color may be set as at least one of the color of the image light PL on the flat surface PS11 corresponding to the first distance L1 and the color of the image light PL on the flat surface PS12 corresponding to the fifth distance L5.

For example, when the color of the image light PL on the flat surface PS11 corresponding to the first distance L1 is set red and the color of the image light PL on the flat surface PS12 corresponding to the fifth distance L5 is set green, the colors corresponding to the line segment that connects the point corresponding to red to the point corresponding to green in the RGB color space are set as the colors of the image light PL on the flat surface PS1. A colorful projection image can therefore be displayed on the flat surface PS1.

FIG. 5 is a screen diagram showing an example of the display visual aspect setting screen 320 corresponding to the convex surface PS3.

The convex surface PS3 includes a seventh section Q31, an eighth section Q32, and a ninth section Q33, as shown in FIG. 2.

The processor 253 detects the seventh section Q31, the eighth section Q32, and the ninth section Q33.

The processor 253 calculates a seventh distance L7, an eighth distance L8, and a ninth distance L9.

The seventh distance L7 represents the distance L between the reference plane ST and the seventh section Q31 of the convex surface PS3. The eighth distance L8 represents the distance L between the reference plane ST and the eighth section Q32 of the convex surface PS3. The ninth distance L9 represents the distance L between the reference plane ST and the ninth section Q33 of the convex surface PS3.

The ninth distance L9 is longer than the seventh distance L7 but shorter than the eighth distance L8, as shown in FIG. 2.

In the first embodiment, the processor 253 accepts input of information that specifies a seventh color CL7 and an eighth color CL8 from the remote control 5 via the display visual aspect setting screen 320.

The seventh color CL7 corresponds to an example of a "seventh visual aspect". The seventh color CL7 represents the color of the projection light projected onto the seventh section Q31 of the convex surface PS3.

The eighth color CL8 corresponds to an example of an "eighth visual aspect". The eighth color CL8 represents the color of the projection light projected onto the eighth section Q32 of the convex surface PS3. The eighth color CL8 differs from the seventh color CL7.

The display visual aspect setting screen 320 displays the setting result display section CS, the visual aspect selection section CP, the first position selection mark NM, and the second position selection mark FM, as shown in FIG. 5. The setting result display section CS includes the first setting result display section CSA, the second setting result display section CSN, and the third setting result display section CSF.

The first setting result display section CSA displays the visual aspect of the image light PL to be projected on the projection surface PS within the range where the distance L is longer than or equal to the seventh distance L7 but shorter than or equal to the eighth distance L8. In FIG. 5, the first setting result display section CSA displays the color of the image light PL to be projected on the convex surface PS3 within the range where the distance L is longer than or equal to the seventh distance L7 but shorter than or equal to the eighth distance L8.

For example, the seventh distance L7 coincides with the second distance L2, and the eighth distance L8 coincides with the third distance L3, as shown in FIG. 2.

FIG. 5 shows the state in which the visual aspect display section C10 has been selected. The second selection mark SM2 displayed around the visual aspect display section C10 indicates that the visual aspect display section C10 has been selected. That is, the selected visual aspect is highlighted. The user selects the visual aspect display section C10, for example, by touching the visual aspect display section C10.

The color of the image light PL on the convex surface PS3 corresponding to the seventh distance L7 can be set black, which is the seventh color CL7, by touching the first position selection mark NM to select the first position selection mark NM and then touching the visual aspect display section C9 of the visual aspect selection section CP to select the visual aspect display section C9. The color of the image light PL on the convex surface PS3 corresponding to the eighth distance L8 can be set gray, which is the eighth color CL8, by touching the second position selection mark FM to select the second position selection mark FM and then touching the visual aspect display section C10 of the visual aspect selection section CP to select the visual aspect display section C10, as shown in FIG. 5.

As a result, black, which is the seventh color CL7, is set at the left end portion of the first setting result display section CSA, gray, which is the eighth color CL8, is set at the right end portion of the first setting result display section CSA, and an intermediate color CL9 is displayed at the central portion of the first setting result display section CSA.

The second setting result display section CSN is set black, which is the seventh color CL7, and the third setting result display section CSF is set gray, which is the eighth color CL8.

As described with reference to FIG. 5, the color of the image light PL on the convex surface PS3 can be set by setting the color of the image light PL on the convex surface PS3 corresponding to the seventh distance L7 and the color of the image light PL on the convex surface PS3 corresponding to the eighth distance L8, as shown in the setting result display section CS. As a result, a projection image having a high degree of freedom can be displayed on the convex surface PS3.

When black is set as the seventh color CL7 at the left end portion of the first setting result display section CSA and gray is set as the eighth color CL8 at the right end portion of the first setting result display section CSA, as shown in FIG. 5, the processor 253 carries out the following processes.

The processor 253 projects the image light PL in the seventh visual aspect AP7 according to the seventh distance L7 onto the seventh section Q31. The seventh visual aspect AP7 represents, for example, the seventh color CL7. The seventh color CL7 is, for example, black, as shown in FIG. 5.

The processor 253 projects the image light PL in the eighth visual aspect AP8 according to the eighth distance L8 onto the eighth section Q32. The eighth visual aspect AP8 represents, for example, the eighth color CL8. The eighth color CL8 is, for example, gray, as shown in FIG. 5.

The processor 253 projects the image light PL in a ninth visual aspect AP9 based on the seventh visual aspect AP7 and the eighth visual aspect AP8 onto the ninth portions Q33. The ninth visual aspect AP9 represents, for example, an intermediate color CL9 between the seventh color CL7 and the eighth color CL8. The intermediate color CL9 is, for example, dark gray.

A luminance value B9 of the intermediate color CL9 corresponding to the ninth distance L9 is expressed, for example, by Expression (7) below.

$$B9=((L9-L7) \times B8+(L8-L9) \times B7)/(L8-L7) \qquad (7)$$

The luminance value B7 represents the luminance value of the seventh color CL7, and the luminance value B8 represents the luminance value of the eighth color CL8.

In FIG. 5, the description has been made of the case where the color of the image light PL on the convex surface PS3 corresponding to the seventh distance L7 is set black, which is the seventh color CL7, and the color of the image light PL on the convex surface PS3 corresponding to the eighth distance L8 is set gray, which is the eighth color CL8, but not necessarily. A chromatic color may be set as at least one of the color of the image light PL on the convex surface PS3 corresponding to the seventh distance L7 and the color of the image light PL on the convex surface PS3 corresponding to the eighth distance L8.

For example, when the color of the image light PL on the convex surface PS3 corresponding to the seventh distance L7 is set red and the color of the image light PL on the convex surface PS3 corresponding to the eighth distance L8 is set green, the colors corresponding to the line segment that connects the point corresponding to red to the point corresponding to green in the RGB color space are set as the colors of the image light PL on the convex surface PS3. A colorful projection image can therefore be displayed on the convex surface PS3.

Figure 6:
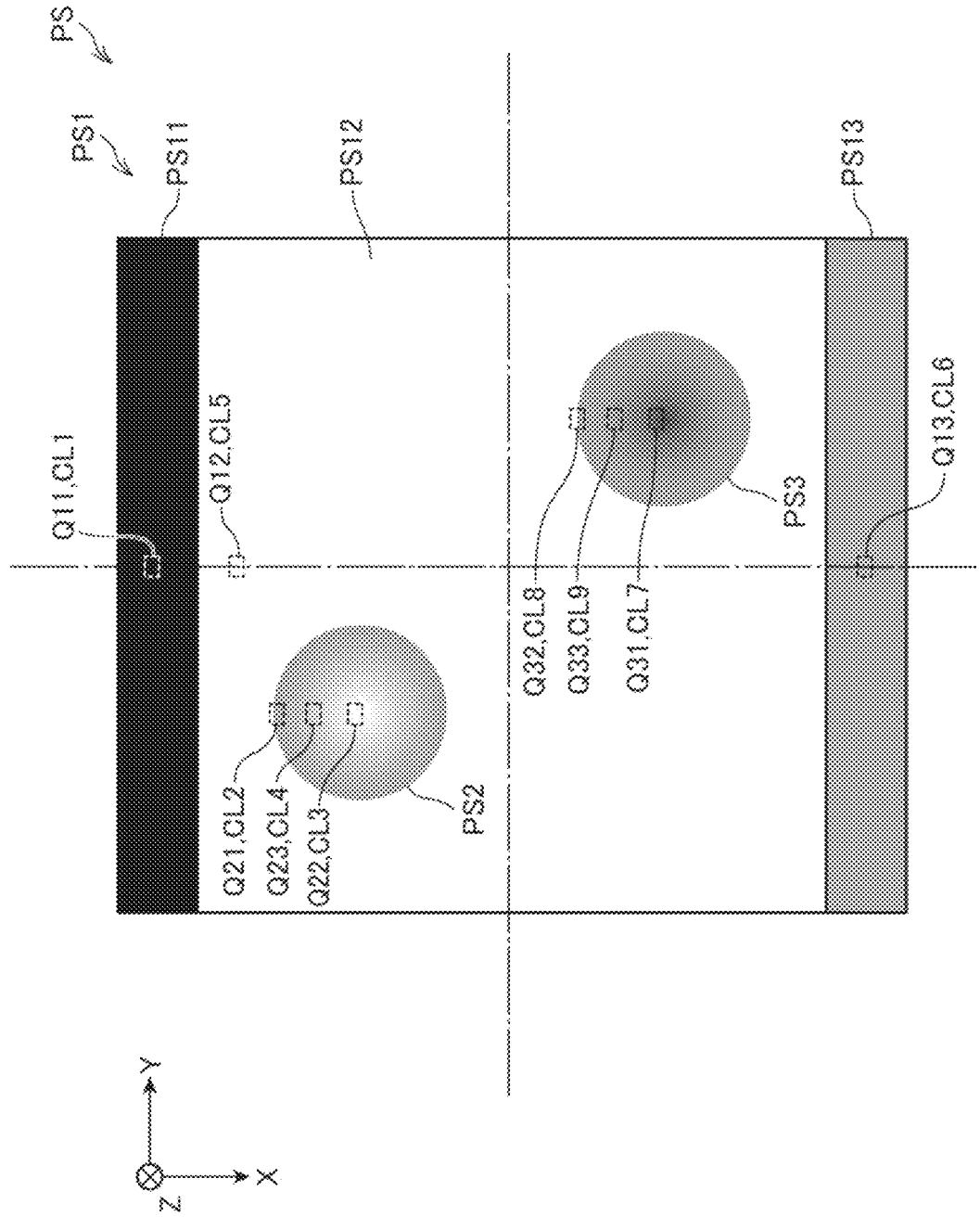
FIG. 6 shows an example of a projection image to be projected on the projection surface.

FIG. 6 shows an example of a projection image to be projected on the projection surface PS according to the first embodiment.

In FIG. 6, a description will be made with reference to a case where the color of the image light PL to be projected on the concave surface PS2 is determined by the display visual aspect setting screen 300 shown in FIG. 3, the color of the image light PL to be projected on the flat surface PS1 is determined by the display visual aspect setting screen 310 shown in FIG. 4, and the color of the image light PL to be projected on the convex surface PS3 is determined by the display visual aspect setting screen 320 shown in FIG. 5.

As described with reference to the display visual aspect setting screen 300 shown in FIG. 3, the processor 253 projects the image light PL in gray as the second color CL2 onto the second section Q21 of the concave surface PS2 and projects the image light PL in white as the third color CL3 onto the third section Q22 of the concave surface PS2. The processor 253 further projects the image light PL in light gray as the intermediate color CL4 between the second color CL2 and the third color CL3 onto the fourth section Q23 of the concave surface PS2.

A gradation image having a gray outer circumferential portion and a white central portion with the gray gradually changing to the white is therefore projected onto the concave surface PS2, as shown in FIG. 6.

As described with reference to the display visual aspect setting screen 310 shown in FIG. 4, the processor 253 projects the image light PL in black as the first color CL1 onto the first section Q11 of the flat surface PS1, that is, the first flat surface PS11. The processor 253 further projects the image light PL in white as the fifth color CL5 onto the fifth section Q12 of the flat surface PS1, that is, the second flat surface PS12. The processor 253 further projects the image light PL in gray as the intermediate color CL6 between the first color CL1 and the fifth color CL5 onto the sixth section Q13 of the flat surface PS1, that is, the third flat surface PS13.

The image light PL projected on the first flat surface PS11, the second flat surface PS12, and the third flat surface PS13, which form the flat surface PS1, has colors different from one another.

As described with reference to the display visual aspect setting screen 320 shown in FIG. 5, the processor 253 projects the image light PL in black as the seventh color CL7 onto the seventh section Q31 of the convex surface PS3 and projects the image light PL in gray as the eighth color CL8 onto the eighth section Q32 of the convex surface PS3. The processor 253 further projects the image light PL in dark gray as the intermediate color CL9 between the seventh color CL7 and the eighth color CL8 onto the ninth section Q33 of the convex surface PS3.

A gradation image having a gray outer circumferential portion and a black central portion with the gray gradually changing to the black is therefore projected onto the convex surface PS3, as shown in FIG. 6.

As described with reference to the display visual aspect setting screen 300 shown in FIG. 3, the display visual aspect setting screen 310 shown in FIG. 4, and the display visual aspect setting screen 320 shown in FIG. 5, determination of the color of the image light PL in correspondence with the distance L for each of the concave surface PS2, the flat surface PS1, and the convex surface PS3 allows a projection image having a high degree of freedom to be projected onto the projection surface PS.

Figure 7:
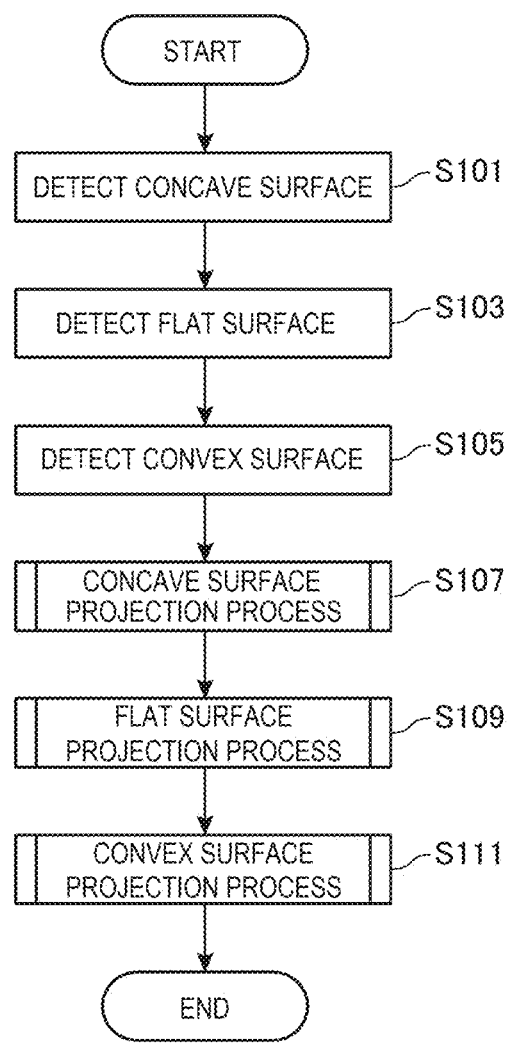
FIG. 7 is a flowchart showing an example of processes carried out by a processor.
Figure 8:
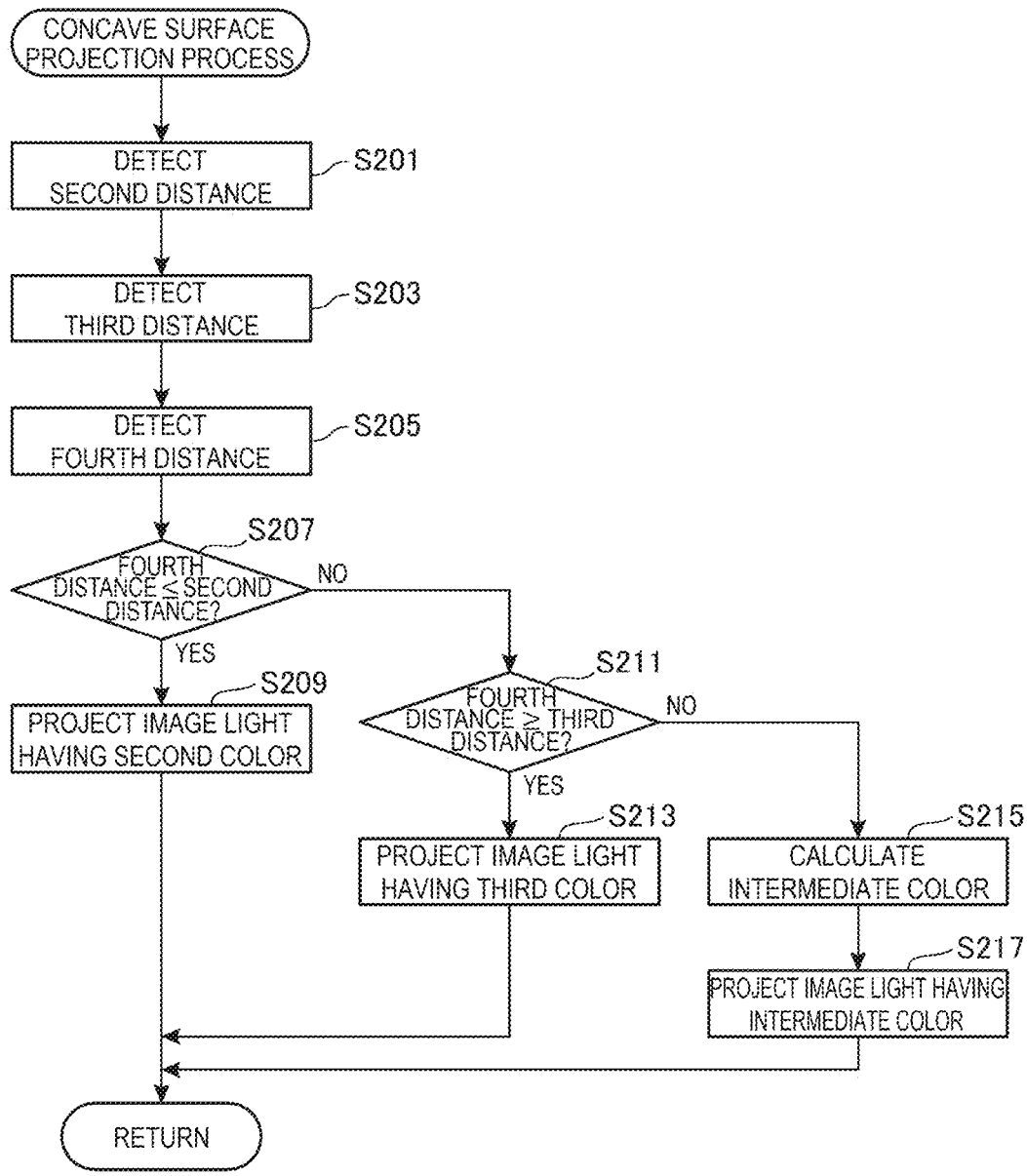
FIG. 8 is a flowchart showing an example of a concave surface projection process carried out by the processor.

The processes carried out by the processor 253 will be described with reference to FIGS. 7 and 8. In FIGS. 7 and 8, a description will be made of the case where the image light PL is projected onto the projection surface PS based on the results set via the display visual aspect setting screen 300 shown in FIG. 3, the display visual aspect setting screen 310 shown in FIG. 4, and the display visual aspect setting screen 320 shown in FIG. 5.

FIG. 7 is a flowchart showing an example of the processes carried out by the processor 253 according to the first embodiment.

First, in step S101, the processor 253 detects the distance L from the reference plane ST to the projection surface PS and detects the concave surface PS2 based on the distance L.

Thereafter, in step S103, the processor 253 detects the flat surface PS1 based on the distance L.

Thereafter, in step S105, the processor 253 detects the convex surface PS3 based on the distance L.

Thereafter, in step S107, the processor 253 carries out a "concave surface projection process". The "concave surface projection process" is the process of determining the color of the image light PL to be projected onto the concave surface PS2 detected in step S101 and projects the image light PL having the determined color onto the concave surface PS2. The "concave surface projection process" will be described with reference to FIG. 8.

Thereafter, in step S109, the processor 253 carries out a "flat surface projection process". The "flat surface projection process" is the process of determining the color of the image light PL to be projected onto the flat surface PS1 detected in step S103 and projects the image light PL having the determined color onto the flat surface PS1.

Thereafter, in step S111, the processor 253 carries out a "convex surface projection process". The processes are then terminated. The "convex surface projection process" is the process of determining the color of the image light PL to be projected onto the convex surface PS3 detected in step S105 and projects the image light PL having the determined color onto the convex surface PS3.

FIG. 8 is a flowchart showing an example of the concave surface projection process carried out by the processor 253 according to the first embodiment. The concave surface projection process is carried out in step S107 in FIG. 7.

No description of the flat surface projection process or the convex surface projection process with reference to a flowchart will be made for convenience.

First, in step S201, the processor 253 detects the second section Q21 of the concave surface PS2 and detects the second distance L2, which is the distance L between the reference plane ST and the second section Q21.

Thereafter, in step S203, the processor 253 detects the third section Q22 of the concave surface PS2 and detects the third distance L3, which is the distance L between the reference plane ST and the third section Q22.

Thereafter, in step S205, the processor 253 detects an arbitrary portion of the concave surface PS2 and detects the fourth distance L4, which is the distance L between the reference plane ST and the arbitrary portion described above.

Thereafter, in step S207, the processor 253 evaluates whether or not the fourth distance L4 is shorter than or equal to the second distance L2.

When the processor 253 determines that the fourth distance L4 is shorter than or equal to the second distance L2, that is, the result of step S207 is YES, the processor 253 proceeds to the process in step S209.

Thereafter, in step S209, the processor 253 projects, for example, the image light PL in gray as the second color CL2 onto the second section Q21 and the arbitrary portion described above. As described with reference to the display visual aspect setting screen 300 shown in FIG. 3, the second color CL2 is set gray, as will be described below. That is, the color of the image light PL on the concave surface PS2 corresponding to the second distance L2 is set gray, which is the second color CL2, by touching the first position selection mark NM to select the first position selection mark NM and then touching the visual aspect display section C10 of the visual aspect selection section CP to select the visual aspect display section C10.

When the processor 253 determines that the fourth distance L4 is not shorter than or equal to the second distance L2, that is, the result of step S207 is NO, the processor 253 proceeds to the process in step S211.

Thereafter, in step S211, the processor 253 evaluates whether or not the fourth distance L4 is longer than or equal to the third distance L3.

When the processor 253 determines that the fourth distance L4 is longer than or equal to the third distance L3, that is, the result of step S211 is YES, the processor 253 proceeds to the process in step S213.

Thereafter, in step S213, the processor 253 projects, for example, the image light PL in white as the third color CL3 onto the third section Q22 and the arbitrary portion described above. As described with reference to the display visual aspect setting screen 300 shown in FIG. 3, the third color CL3 is set white, as will be described below. That is, the color of the image light PL on the concave surface PS2 corresponding to the third distance L3 is set white, which is the third color CL3, by touching the second position selection mark FM to select the second position selection mark FM and then touching the visual aspect display section C11 of the visual aspect selection section CP to select the visual aspect display section C11.

When the processor 253 determines that the fourth distance L4 is not longer than or equal to the third distance L3, that is, the result of step S211 is NO, the processor 253 proceeds to the process in step S215.

Thereafter, in step S215, the processor 253 calculates the intermediate color CL4 between the second color CL2 and the third color CL3 based on the fourth distance L4. The luminance value B4 of the intermediate color CL4 is determined, for example, by Expression (2) described above, as described with reference to FIG. 3.

Thereafter, in step S217, the processor 253 projects the image light PL having the intermediate color CL4 onto the fourth section Q23 corresponding to the arbitrary portion described above. The processor 253 then returns to the process in step S109 in FIG. 7.

A gradation image having an outer circumferential portion having the second color CL2 and a central portion having the third color CL3 with the second color CL2 gradually changing to the third color CL3 can thus be projected onto the concave surface PS2. Adjusting the second color CL2 and the third color CL3 therefore allows a projection image having a high degree of freedom to be projected onto the concave surface PS2.

In FIG. 8 and the description in FIG. 8, replacing the second distance L2, the third distance L3, and the fourth distance L4 with the seventh distance L7, the eighth distance L8, and the ninth distance L9, respectively, provides an example showing the details of the convex surface projection process in step S111. A gradation image having an outer circumferential portion having the seventh color CL7 and a central portion having the eighth color CL8 with the seventh color CL7 gradually changing to the eighth color CL8 is therefore projected onto the convex surface PS3, as in the concave surface projection process. Adjusting the seventh color CL7 and the eighth color CL8 therefore allows a projection image having a high degree of freedom to be projected onto the convex surface PS3.

In FIG. 8 and the description in FIG. 8, replacing the second distance L2, the third distance L3, and the fourth distance L4 with the first distance L1, the fifth distance L5, and the sixth distance L6, respectively, provides an example showing the details of the flat surface projection process in step S109. An image can therefore be projected onto the flat surface PS1 in such a way that the flat surface PS12 corresponding to the fifth distance L5 has the fifth color CL5 and the fifth color CL5 gradually changes to the first color CL1 as the distance L decreases, as in the concave surface projection process. Adjusting the first color CL1 and the fifth color CL5 allows a projection image having a high degree of freedom to be projected onto the flat surface PS1.

The first embodiment has been described with reference to the case where the flat surface PS11, the flat surface PS12, and the flat surface PS13, which form the flat surface PS1, are each parallel to the reference plane ST, as shown in FIG. 2, but not necessarily. When the flat surface PS1 inclines with respect to the reference plane ST, a gradation image so colored that the first color CL1 changes to the fifth color CL5 can be projected onto the flat surface PS1, as similar gradation images are projected onto the concave surface PS2 and the convex surface PS3. In this case, adjusting the first color CL1 and the fifth color CL5 allows a projection image having a higher degree of freedom to be projected onto the flat surface PS1.

Second Embodiment

Figure 9:
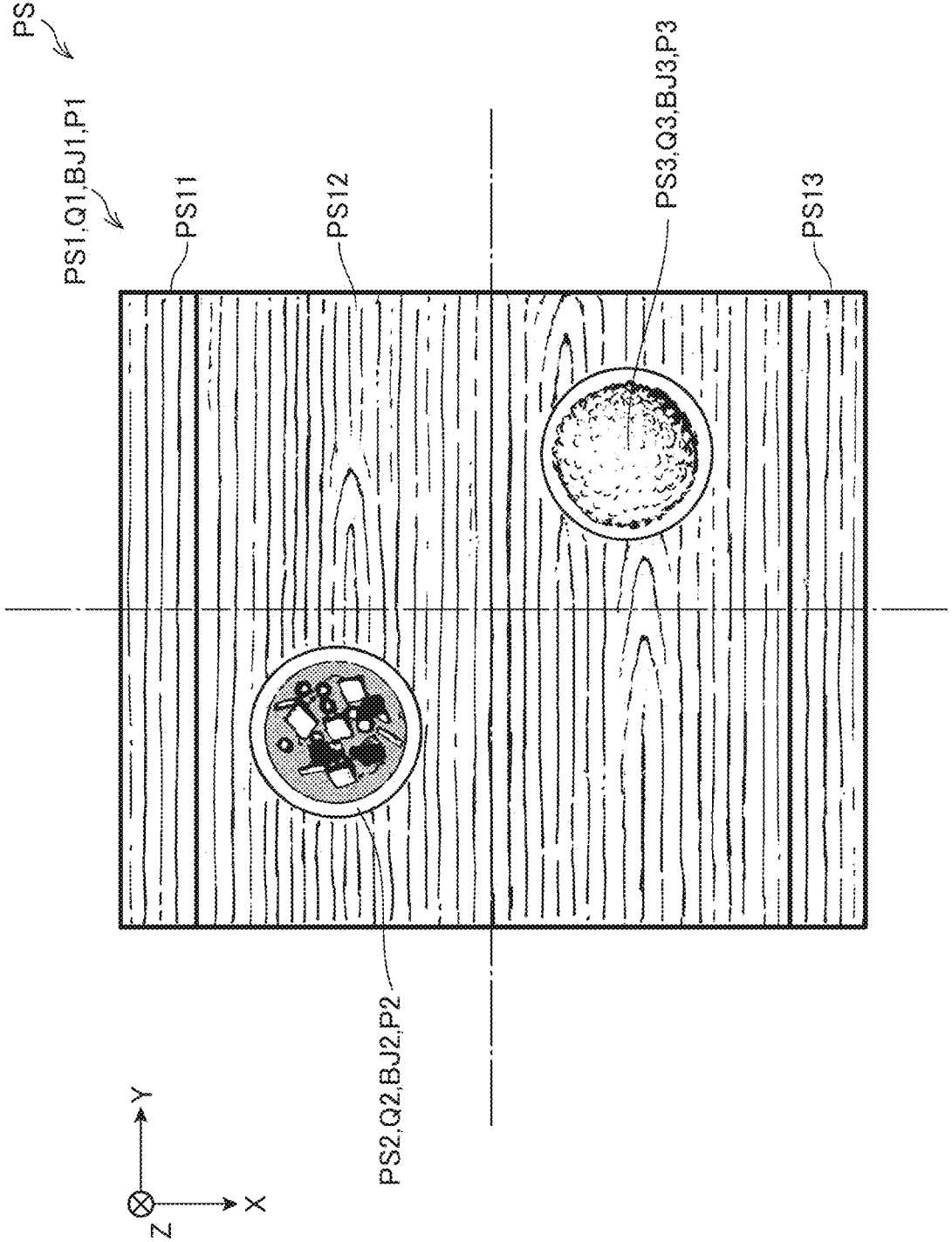
FIG. 9 shows another example of the projection image to be projected onto the projection surface.

FIG. 9 shows another example of the projection image to be projected onto the projection surface PS according to a second embodiment.

In the second embodiment, the processor 253 detects as a first section Q1 the entire flat surface PS1 of the projection surface PS. The processor 253 further detects as a second section Q2 the entire concave surface PS2 of the projection surface PS. The processor 253 further detects as a third section Q3 the entire convex surface PS3 of the projection surface PS.

The processor 253 accepts an input that specifies a first image P1 to be projected onto a first section Q1 from the remote control 5. The processor 253 further accepts an input that specifies a second image P2 to be projected onto the second section Q2 from the remote control 5. The processor 253 further accepts an input that specifies a third image P3 to be projected onto the third section Q3 from the remote control 5.

The processor 253 then projects the image light in the first visual aspect AP1 onto the first section Q1. The first visual aspect AP1 is the first image P1, which represents a first object BJ1 corresponding to the entire flat surface PS1. The first object BJ1 is, for example, a dining table. The first image P1 is, for example, a plan-view image of the dining table. Using the first image P1 readily allows the entire flat surface PS1 to look like the first object BJ1.

The processor 253 further projects the image light in the second visual aspect AP2 onto the second section Q2. The second visual aspect AP2 is the second image P2, which represents a second object BJ2 corresponding to the entire concave surface PS2. The second object BJ2 differs from the first object BJ1. The second object BJ2 is, for example, a bowl containing miso soup. The second image P2 is, for example, a plan-view image of the bowl containing miso soup. Using the second image P2 readily allows the entire concave surface PS2 to look like the second object BJ2.

The processor 253 further projects the image light in the third visual aspect AP3 onto the third section Q3. The third visual aspect AP3 is the third image P3, which represents a third object BJ3 corresponding to the entire convex surface PS3. The third object BJ3 differs from the first object BJ1 and the second object BJ2. The third object BJ3 is, for example, a bowl containing rice. The third image P3 is, for example, a plan-view image of the bowl containing rice. Using the third image P3 readily allows the entire convex surface PS3 to look like the third object BJ3.

As described with reference to FIG. 9, the processor 253 projects the image light PL representing the first image P1 onto the entire flat surface PS1, projects the image light PL representing the second image P2 onto the entire concave surface PS2, and projects the image light PL representing the third image P3 onto the entire convex surface PS3. Specifying the first image P1, the second image P2, and the third image P3 therefore allows a projection image having a high degree of freedom to be projected onto the projection surface PS.

Configurations and Effects

As described above with reference to FIGS. 1 to 9, the projection method according to the present embodiment includes detecting the first section Q11 or Q1, which is formed of the flat surface PS1, at the projection surface PS, detecting the second section Q21 or Q2, which is formed of the concave surface PS2, at the projection surface PS, causing the projector 200 to project the image light PL in the first visual aspect AP1 onto the first section Q11 or Q1, and causing the projector 200 to project the image light PL in the second visual aspect AP2 different from the first visual aspect AP1 onto the second section Q21 or Q2.

According to the configuration described above, the projector 200 projects the image light PL in the first visual aspect AP1 onto the first section Q11 or Q1, which is formed of the flat surface PS1, and projects the image light PL in the second visual aspect AP2 different from the first visual aspect AP1 onto the second section Q21 or Q2, which is formed of the concave surface PS2.

The image light PL projected onto the first section Q11 or Q1, which is formed of the flat surface PS1, and the image light PL projected onto the second section Q21 or Q2, which is formed of the concave surface PS2, differ from each other in term of visual aspect, the degree of freedom of each of the images projected onto the projection surface PS can be increased.

The projection method described above further includes accepting an input that specifies at least one of the first visual aspect AP1 and the second visual aspect AP2.

According to the configuration described above, an input that specifies at least one of the first visual aspect AP1 and the second visual aspect AP2 is accepted.

The user can therefore specify at least one of the first visual aspect AP1 and the second visual aspect AP2. The convenience of the user can therefore be improved.

The projection method according to the first embodiment further includes, in addition to those described in the projection method described above, detecting the third section Q22 formed of the concave surface PS2 but different from the second section Q21 at the projection surface PS, detecting the second distance L2, which is the distance between the projector 200 and the second section Q21, detecting the third distance L3, which is the distance between the projector 200 and the third section Q22, and causing the projector 200 to project the image light PL in the third visual aspect AP3 different from the second visual aspect AP2 onto the third section Q22, and when the second distance L2 differs from the third distance L3, the second visual aspect AP2 is an aspect according to the second distance L2, and the third visual aspect AP3 is an aspect according to the third distance L3 and different from the second visual aspect AP2.

According to the configuration described above, when the projector 200 projects the image light PL in the third visual aspect AP3 onto the third section Q22 formed of the concave surface PS2 but different from the second section Q21, and the second distance L2 differs from the third distance L3, the second visual aspect AP2 is an aspect according to the second distance L2, and the third visual aspect AP3 is an aspect according to the third distance L3 and different from the second visual aspect AP2.

The image light PL in the third visual aspect AP3 according to the third distance L3 and different from the second visual aspect AP2 is therefore projected onto the third section Q22, which is formed of the concave surface PS2 but different from the second section Q21, whereby the degree of freedom of each of the images projected onto the projection surface PS can be increased.

The projection method according to the first embodiment further includes, in addition to those described in the projection method described above, detecting the fourth section Q23, which is formed of the concave surface PS2 but different from the second section Q21 and the third section Q22, at the projection surface PS, detecting the fourth distance L4, which is the distance between the projector 200 and the fourth section Q23, and causing the projector 200 to project the image light PL in the fourth visual aspect AP4 based on the second visual aspect AP2 and the third visual aspect AP3 onto the fourth section Q23 when the fourth distance L4 is longer than the second distance L2 but shorter than the third distance L3.

According to the configuration described above, when the fourth distance L4, which is the distance between the projector 200 and the fourth section Q23, which is formed of the concave surface PS2 but different from the second section Q21 and the third section Q22, is longer than the second distance L2 but shorter than the third distance L3, the projector 200 projects the image light PL in the fourth visual aspect AP4 based on the second visual aspect AP2 and the third visual aspect AP3 onto the fourth section Q23.

The image light PL in the fourth visual aspect AP4 based on the second visual aspect AP2 and the third visual aspect AP3 is therefore projected onto the fourth section Q23 of the concave surface PS2, whereby the degree of freedom of each of the images projected onto the projection surface PS can be increased.

In the projection method according to the first embodiment, in addition to the features of the projection method described above, the second visual aspect AP2 is the second color CL2, the third visual aspect AP3 is the third color CL3 different from the second color CL2, and the fourth visual aspect AP4 is the intermediate color CL4 between the second color CL2 and the third color CL3.

According to the configuration described above, the second visual aspect AP2 is the second color CL2, the third visual aspect AP3 is the third color CL3 different from the second color CL2, and the fourth visual aspect AP4 is the intermediate color CL4 between the second color CL2 and the third color CL3.

Therefore, since the fourth visual aspect AP4 is the intermediate color CL4 between the second color CL2 and the third color CL3, the fourth visual aspect AP4 can be readily determined.

The projection method according to the first embodiment further includes, in addition to those described in the projection method described above, detecting the fifth section Q12, which is formed of the flat surface PS1 but different from the first section Q11, at the projection surface PS, detecting the first distance L1, which is the distance between the projector 200 and the first section Q11, detecting the fifth distance L5, which is the distance between the projector 200 and the fifth section Q12, and causing the projector 200 to project the image light PL in the fifth visual aspect AP5 onto the fifth section Q12, and when the first distance L1 differs from the fifth distance L5, the first visual aspect AP1 is an aspect according to the first distance L1, and the fifth visual aspect AP5 is an aspect according to the fifth distance L5 and different from the first visual aspect AP1.

According to the configuration described above, when the projector 200 projects the image light PL in the fifth visual aspect AP5 onto the fifth section Q12 formed of the flat surface PS1 but different from the first section Q11, and the first distance L1 differs from the fifth distance L5, the first visual aspect AP1 is an aspect according to the first distance L1, and the fifth visual aspect AP5 is an aspect according to the fifth distance L5 and different from the first visual aspect AP1.

The image light PL in the fifth visual aspect AP5 according to the fifth distance L5 and different from the first visual aspect AP1 is therefore projected onto the fifth section Q12, which is formed of the flat surface PS1 but different from the first section Q11, whereby the degree of freedom of each of the images projected onto the projection surface PS can be increased.

The projection method according to the first embodiment further includes, in addition to those described in the projection method described above, detecting the sixth section Q13, which is formed of the flat surface PS1 but different from the first section Q11 and the fifth section Q12, at the projection surface PS, detecting the sixth distance L6, which is the distance between the projector 200 and the sixth section Q13, and causing the projector 200 to project the image light PL in the sixth visual aspect AP6 based on the first visual aspect AP1 and the fifth visual aspect AP5 onto the sixth section Q13 when the sixth distance L6 is longer than the first distance L1 but shorter than the fifth distance L5.

According to the configuration described above, when the sixth distance L6, which is the distance between the projector 200 and the sixth section Q13, which is formed of the flat surface PS1 but different from the first section Q11 and the fifth section Q12, is longer than the first distance L1 but shorter than the fifth distance L5, the projector 200 projects the image light PL in the sixth visual aspect AP6 based on the first visual aspect AP1 and the fifth visual aspect AP5.

The image light PL in the sixth visual aspect AP6 based on the first visual aspect AP1 and the fifth visual aspect AP5 is therefore projected onto the sixth section Q13 of the flat surface PS1, whereby the degree of freedom of each of the images projected onto the projection surface PS can be increased.

In the projection method according to the first embodiment, in addition to the features of the projection method described above, the first visual aspect AP1 is the first color CL1, the fifth visual aspect AP5 is the fifth color CL5 different from the first color CL1, and the sixth visual aspect AP6 is the intermediate color CL6 between the first color CL1 and the fifth color CL5.

According to the configuration described above, the first visual aspect AP1 is the first color CL1, the fifth visual aspect AP5 is the fifth color CL5, and the sixth visual aspect AP6 is the intermediate color CL6 between the first color CL1 and the fifth color CL5.

Therefore, since the sixth visual aspect AP6 is the intermediate color CL6 between the first color CL1 and the fifth color CL5, the sixth visual aspect AP6 can be readily determined.

The projection method according to the first embodiment further includes, in addition to those described in the projection method described above, detecting the seventh section Q31, which is formed of the convex surface PS3, at the projection surface PS and causing the projector 200 to project the image light PL in the seventh visual aspect AP7 different from the first visual aspect AP1 and the second visual aspect AP2 onto the seventh section Q31.

According to the configuration described above, the image light PL in the seventh visual aspect AP7 different from the first visual aspect AP1 and the second visual aspect AP2 is projected onto the seventh section Q31 formed of the convex surface PS3.

The degree of freedom of each of the images projected onto the projection surface PS can therefore be increased.

The projection method according to the first embodiment further includes, in addition to those described in the projection method described above, detecting the eighth section Q32, which is formed of the convex surface PS3 but different from the seventh section Q31, at the projection surface PS, detecting the seventh distance L7, which is the distance between the projector 200 and the seventh section Q31, detecting the eighth distance L8, which is the distance between the projector 200 and the eighth section Q32, and causing the projector 200 to project the image light PL in the eighth visual aspect AP8 onto the eighth section Q32, and when the seventh distance L7 differs from the eighth distance L8, the seventh visual aspect AP7 is an aspect according to the seventh distance L7, and the eighth visual aspect AP8 is an aspect according to the eighth distance L8 and different from the seventh visual aspect AP7.

According to the configuration described above, when the projector 200 projects the image light PL in the eighth visual aspect AP8 onto the eighth section Q32 formed of the convex surface PS3 but different from the seventh section Q31 at the projection surface PS, and the seventh distance L7 differs from the eighth distance L8, the eighth visual aspect AP8 is an aspect according to the eighth distance L8 and different from the seventh visual aspect AP7.

The image light PL in the eighth visual aspect AP8 according to the eighth distance L8 and different from the seventh visual aspect AP7 is therefore projected onto the eighth section Q32, which is formed of the convex surface PS3 but different from the seventh section Q31, whereby the degree of freedom of each of the images projected onto the projection surface PS can be increased.

The projection method according to the first embodiment further includes, in addition to those described in the projection method described above, detecting the ninth section Q33, which is formed of the convex surface PS3 but different from the seventh section Q31 and the eighth section Q32, at the projection surface PS, detecting the ninth distance L9, which is the distance between the projector 200 and the ninth section Q33, and causing the projector 200 to project the image light PL in the ninth visual aspect AP9 based on the seventh visual aspect AP7 and the eighth visual aspect AP8 onto the ninth section Q33 when the ninth distance L9 is longer than the seventh distance L7 but shorter than the eighth distance L8.

According to the configuration described above, when the ninth distance L9, which is the distance between the projector 200 and the ninth section Q33, which is formed of the convex surface PS3 but different from the seventh section Q31 and the eighth section Q32, is longer than the seventh distance L7 but shorter than the eighth distance L8, the projector 200 projects the image light PL in the ninth visual aspect AP9 based on the seventh visual aspect AP7 and the eighth visual aspect AP8 onto the ninth section Q33.

The image light PL in the ninth visual aspect AP9 based on the seventh visual aspect AP7 and the eighth visual aspect AP8 is therefore projected onto the ninth section Q33 of the convex surface PS3, whereby the degree of freedom of each of the images projected onto the projection surface PS can be increased.

In the projection method according to the first embodiment, in addition to the features of the projection method described above, the seventh visual aspect AP7 is the seventh color CL7, the eighth visual aspect AP8 is the eighth color CL8 different from the seventh color CL7, and the ninth visual aspect AP9 is the intermediate color CL9 between the seventh color CL7 and the eighth color CL8.

According to the configuration described above, the seventh visual aspect AP7 is the seventh color CL7, the eighth visual aspect AP8 is the eighth color CL8, and the ninth visual aspect AP9 is the intermediate color CL9 between the seventh color CL7 and the eighth color CL8.

Therefore, since the ninth visual aspect AP9 is the intermediate color CL9 between the seventh color CL7 and the eighth color CL8, the ninth visual aspect AP9 can be readily determined.

In the projection method according to the first embodiment, in addition to the features of the projection method described above, the first section Q1 is the entire flat surface PS1 of the projection surface PS, the first visual aspect AP1 is the first image P1 representing the first object BJ1 corresponding to the entire flat surface PS1, the second section Q2 is the entire concave surface PS2 of the projection surface PS, the second visual aspect AP2 is the second image P2 corresponding to the entire concave surface PS2 and representing the second object BJ2 different from the first object BJ1.

According to the configuration described above, the first section Q1 is the entire flat surface PS1 of the projection surface PS, the first visual aspect AP1 is the first image P1 representing the first object BJ1 corresponding to the entire flat surface PS1, the second section Q2 is the entire concave surface PS2 of the projection surface PS, and the second visual aspect AP2 is the second image P2 corresponding to the entire concave surface PS2 and representing the second object BJ2 different from the first object BJ1.

Therefore, since the first image P1 representing the first object BJ1 is projected onto the entire flat surface PS1, and the second image P2 is projected onto the entire concave surface PS2, the degree of freedom of each of the images projected onto the projection surface PS can be increased by selecting the first image P1 and the second image P2.

The projector 200 according to the present embodiment includes the light source section 211, the light modulator 212, the distance sensor 242, and the controller 250. The controller 250 uses the distance sensor 242 to detect the first section Q11 or Q1, which is formed of the flat surface PS1, at the projection surface PS, uses the distance sensor 242 to detect the second section Q21 or Q2, which is formed of the concave surface PS2, at the projection surface PS, uses the light source section 211 and the light modulator 212 to project the image light PL in the first visual aspect AP1 onto the first section Q11 or Q1, and uses the light source section 211 and the light modulator 212 to project the image light PL in the second visual aspect AP2 different from the first visual aspect AP1 onto the second section Q21 or Q2.

The configuration described above provides the same effects provided by the projection method according to the present embodiment.

Aspects of Variations

The present embodiment described above is a preferable embodiment. The present disclosure is, however, not limited to the embodiment described above, and a variety of variations are conceivable to the extent that the variations do not depart from the substance of the present disclosure.

In the present embodiment, the projection surface PS includes the flat surface PS1, the concave surface PS2, and the convex surface PS3, but not necessarily. The projection surface PS only needs to include the flat surface PS1 and the concave surface PS2.

In the present embodiment, the flat surface PS1 includes the first flat surface PS11, the second flat surface PS12, and the third flat surface PS13, but not necessarily. The flat surface PS1 may instead be formed of a single flat surface or two flat surfaces. Still instead, the flat surface PS1 may include four or more flat surfaces.

The positions and sizes of the first flat surface PS11, the second flat surface PS12, and the third flat surface PS13 are not limited to the positions and sizes shown in FIG. 2.

In the present embodiment, the projection surface PS includes the single concave surface PS2 and the single convex surface PS3, but not necessarily. The projection surface PS may include a plurality of concave surfaces or a plurality of convex surfaces.

The position and size of the concave surface PS2 are not limited to the position and size shown in FIG. 2. The position and size of the convex surface PS3 are not limited to the position and size shown in FIG. 2.

In the present embodiment, the first visual aspect AP1 is the first color CL1, and the second visual aspect AP2 is the second color CL2, but not necessarily. The first visual aspect AP1 and the second visual aspect AP2 may each be a color, a pattern, or a combination of a color and a pattern, or an image representing an object BJ.

In the present embodiment, the controller 250 accepts input of information that specifies the first color CL1 and the second color CL2, but not necessarily. The controller 250 may accept one of the first visual aspect AP1 and the second visual aspect AP2.

The functional portions shown in FIG. 1 each represent a functional configuration and are each not necessarily implemented in a specific form. That is, hardware corresponding to each of the functional portions is not necessarily implemented, and a single processor that executes a program can, of course, achieve the functions of the plurality of functional portions. Furthermore, part of the functions achieved by software in the embodiment described above may be achieved by hardware, or part of the functions achieved by hardware in the embodiment described above may be achieved by software. In addition, the specific detailed configuration of each of the other portions of the projector 200 can be arbitrarily changed to the extent that the change does not depart from the substance of the present disclosure.

The process units in the flowcharts shown in FIGS. 7 and 8 are process units divided in accordance with the contents of primary processes for easy understanding of the processes carried out by the controller 250. The process units in the flowcharts shown in FIGS. 7 and 8 are not limited by how to produce the divided process units or the names of the process units. A process carried out by the controller 250 can be further divided into a larger number of process units in accordance with the content of the process, and each of the process units can further be divided into a large number of processes. Further, the orders in which the processes are carried out in the flowcharts described above are not limited to that shown in FIGS. 7 and 8.

The projection method used with the projector 200 can be achieved by causing the processor 253 provided in the projector 200 to execute a control program corresponding to the projection method used with the projector 200. The control program can instead be recorded on a computer readable recording medium. The recording medium can be a magnetic or optical recording medium or a semiconductor memory device.

Specific examples of the recording medium may include a flexible disk, an HDD (hard disk drive), a CD-ROM (compact disk read only memory), a DVD (digital versatile disc), a Blu-ray (registered trademark) disc, a magneto-optical disk, a flash memory, and a portable or immobile recording medium such as a card-shaped recording medium. The recording medium may instead be a RAM, a ROM, an HDD, or any other nonvolatile storage apparatus that is an internal storage apparatus provided in the projector 200.

The control program corresponding to the projection method used with the projector 200 can be stored, for example, in a server apparatus, and the control program can be downloaded from the server apparatus to the projector 200 to achieve the projection method used with the projector 200.

What is claimed is:

1. A projection method comprising:
    detecting a first section formed of a flat surface at a projection surface;
    detecting a second section formed of a concave surface at the projection surface based at least in part on a radius of a curvature of the second section and a center of the curvature of the second section;
    projecting image light in a first visual aspect onto the first section by a projector; and
    projecting image light in a second visual aspect different from the first visual aspect onto the second section by the projector.

2. The projection method according to claim 1, further comprising accepting an input that specifies at least one of the first visual aspect and the second visual aspect.

3. The projection method according to claim 1, further comprising:
- detecting a third section formed of the concave surface different from the second section at the projection surface;
- detecting a second distance that is a distance between the projector and the second section;
- detecting a third distance that is a distance between the projector and the third section; and
- projecting image light in a third visual aspect onto the third section by the projector,
- wherein when the second distance differs from the third distance,
  - the second visual aspect is an aspect according to the second distance, and
  - the third visual aspect is an aspect according to the third distance and different from the second visual aspect.

4. The projection method according to claim 3, further comprising:
- detecting a fourth section formed of the concave surface different from the second section and the third section at the projection surface;
- detecting a fourth distance that is a distance between the projector and the fourth section; and
- projecting, by the projector, image light in a fourth visual aspect based on the second visual aspect and the third visual aspect onto the fourth section when the fourth distance is longer than the second distance and shorter than the third distance.

5. The projection method according to claim 4,
wherein the second visual aspect is a second color,
the third visual aspect is a third color different from the second color, and
the fourth visual aspect is an intermediate color between the second color and the third color.

6. The projection method according to claim 1, further comprising:
- detecting a fifth section formed of the flat surface different from the first section at the projection surface;
- detecting a first distance that is a distance between the projector and the first section;
- detecting a fifth distance that is a distance between the projector and the fifth section; and
- projecting image light in a fifth visual aspect onto the fifth section by the projector,
- wherein when the first distance differs from the fifth distance,
  - the first visual aspect is an aspect according to the first distance, and
  - the fifth visual aspect is an aspect according to the fifth distance and different from the first visual aspect.

7. The projection method according to claim 6, further comprising:
- detecting a sixth section formed of the flat surface different from the first section and the fifth section at the projection surface;
- detecting a sixth distance that is a distance between the projector and the sixth section; and
- projecting, by the projector, image light in a sixth visual aspect based on the first visual aspect and the fifth visual aspect onto the sixth section when the sixth distance is longer than the first distance and shorter than the fifth distance.

8. The projection method according to claim 7,
wherein the first visual aspect is a first color,
the fifth visual aspect is fifth color different from the first color, and
the sixth visual aspect is an intermediate color between the first color and the fifth color.

9. The projection method according to claim 1, further comprising:
- detecting a seventh section formed of a convex surface at the projection surface; and
- projecting image light in a seventh visual aspect different from the first visual aspect and the second visual aspect onto the seventh section by the projector.

10. The projection method according to claim 9, further comprising:
- detecting an eighth section formed of the convex surface different from the seventh section at the projection surface;
- detecting a seventh distance that is a distance between the projector and the seventh section;
- detecting an eighth distance that is a distance between the projector and the eighth section; and
- projecting image light in an eighth visual aspect onto the eighth section by the projector,
- wherein when the seventh distance differs from the eighth distance,
  - the seventh visual aspect is an aspect according to the seventh distance, and
  - the eighth visual aspect is an aspect according to the eighth distance and different from the seventh visual aspect.

11. The projection method according to claim 10, further comprising:
- detecting a ninth section formed of the convex surface different from the seventh section and the eighth section at the projection surface;
- detecting a ninth distance that is a distance between the projector and the ninth section; and
- projecting, by the projector, image light in a ninth visual aspect based on the seventh visual aspect and the eighth visual aspect onto the ninth section when the ninth distance is longer than the seventh distance and shorter than the eighth distance.

12. The projection method according to claim 11,
wherein the seventh visual aspect is a seventh color,
the eighth visual aspect is an eighth color different from the seventh color, and
the ninth visual aspect is an intermediate color between the seventh color and the eighth color.

13. The projection method according to claim 1,
wherein the first section is an entire flat surface of the projection surface,
the first visual aspect is an image representing a first object corresponding to the entire flat surface,
the second section is the entire concave surface of the projection surface, and
the second visual aspect is an image corresponding to the entire concave surface and representing a second object different from the first object.

14. A projector comprising:
- a light source;
- a light modulator that modulates light outputted from the light source;
- a distance sensor; and
- at least one processor that performs operations comprising:
  - detecting a first section formed of a flat surface at a projection surface using the distance sensor;

detecting a second section formed of a concave surface at the projection surface based at least in part on a radius of a curvature of the second section using the distance sensor;

projecting image light in a first visual aspect onto the first section using the light source and the light modulator; and projecting image light in a second visual aspect different from the first visual aspect onto the second section using the light source and the light modulator.

\* \* \* \* \*